US009999067B2

United States Patent
Seo et al.

(10) Patent No.: US 9,999,067 B2
(45) Date of Patent: *Jun. 12, 2018

(54) METHOD AND APPARATUS FOR SCHEDULING IN A WIRELESS COMMUNICATION SYSTEM

(71) Applicant: LG ELECTRONICS INC., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

This patent is subject to a terminal disclaimer.

(21) Appl. No.: 15/192,789

(22) Filed: Jun. 24, 2016

(65) Prior Publication Data

US 2016/0309497 A1    Oct. 20, 2016

Related U.S. Application Data

(63) Continuation of application No. 14/009,835, filed as application No. PCT/KR2012/002578 on Apr. 5, 2012, now Pat. No. 9,398,607.

(Continued)

(51) Int. Cl.
*H04W 4/00* (2018.01)
*H04W 72/12* (2009.01)
*H04B 7/26* (2006.01)

(52) U.S. Cl.
CPC ...... *H04W 72/1263* (2013.01); *H04B 7/2656* (2013.01); *H04W 72/1278* (2013.01)

(58) Field of Classification Search
CPC combination set(s) only.
See application file for complete search history.

(56) References Cited

U.S. PATENT DOCUMENTS 8,675,542 B2    3/2014  Kim et al.
8,804,618 B2 *  8/2014  Hu .................. H04W 72/00
                                                370/328

(Continued)

FOREIGN PATENT DOCUMENTS

CN    101790202 A    7/2010
CN    101796776 A    8/2010

(Continued)

*Primary Examiner* — Frank Duong
(74) *Attorney, Agent, or Firm* — Birch, Stewart, Kolasch & Birch, LLP

(57) ABSTRACT

A method and apparatus are provided for configuring subframes in a wireless communication system. A user equipment (UE) receives an uplink-downlink configuration from a base station. The uplink-downlink configuration indicates each of a plurality of subframes in a frame to any one of a downlink subframe, a special subframe and an uplink subframe. The special subframe includes a downlink pilot time slot (DwPTS), a guard period (GP) and an uplink pilot time slot (UpPTS). The UE receives frame configuration information from the base station and configures each of the plurality of subframes in the frame to any one of a downlink subframe, a special subframe and an uplink subframe based on the uplink-downlink configuration and the frame configuration information. The UE communicates with the base station using the configured subframes.

12 Claims, 23 Drawing Sheets

Related U.S. Application Data

(60) Provisional application No. 61/505,516, filed on Jul. 7, 2011, provisional application No. 61/471,703, filed on Apr. 5, 2011.

(56) References Cited

U.S. PATENT DOCUMENTS

| | | |
|---|---|---|
| 2010/0027446 A1 | 2/2010 | Choi et al. |
| 2011/0149813 A1 | 6/2011 | Parkvall et al. |
| 2011/0211503 A1 | 9/2011 | Che et al. |
| 2011/0292846 A1* | 12/2011 | Hu .................. H04W 72/00 370/280 |
| 2015/0085723 A1 | 3/2015 | Chen et al. |

FOREIGN PATENT DOCUMENTS

| | | |
|---|---|---|
| CN | 101945334 A | 1/2011 |
| EP | 2693679 A1 | 2/2014 |
| WO | WO 2009/073250 A2 | 6/2009 |
| WO | WO 2009/104922 A2 | 8/2009 |
| WO | WO 2009/120701 A2 | 10/2009 |
| WO | WO 2010/049587 A1 | 5/2010 |
| WO | WO 2010/129295 A1 | 11/2010 |
| WO | WO 2011/077288 A2 | 6/2011 |
| WO | WO 2012/130179 A1 | 10/2012 |

* cited by examiner

FIG. 12

| subframe number | 0 | 1 | 2 | 3 | 4 | 5 | 6 | 7 | 8 | 9 |
|---|---|---|---|---|---|---|---|---|---|---|
| | P | | U | D | | P | | U | D | |

METHOD AND APPARATUS FOR SCHEDULING IN A WIRELESS COMMUNICATION SYSTEM

CROSS-REFERENCE TO RELATED APPLICATIONS

This application is a Continuation of U.S. application Ser. No. 14/009,835 filed on Dec. 19, 2013 (now U.S. Pat. No. 9,398,607 issued on Jul. 19, 2016), which is the National Phase of PCT/KR2012/002578 filed on Apr. 5, 2012, which claims priority under 35 U.S.C. 119(e) to U.S. Provisional Application Nos. 61/471,703 filed on Apr. 5, 2011 and 61/505,516 filed on Jul. 7, 2011, all of which are hereby expressly incorporated by reference into the present application.

BACKGROUND OF THE INVENTION

The present invention relates to wireless communications, and more particularly, to a method and apparatus for scheduling in a wireless communication system.

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, a mobile communication system includes a time division duplex (TDD) system and a frequency division duplex (FDD) system.

In the TDD system, a downlink and an uplink use the same frequency. In the FDD system, a downlink and an uplink use different frequencies. As such, the TDD system and the FDD system use different radio resources, and thus may have different frame structures.

For example, in the FDD system, a downlink subframe and an uplink subframe exist for all time durations in a frame. On the other hand, in the TDD system, a downlink subframe and an uplink subframe may exist in different numbers in a frame.

Conventionally, in the TDD system, an uplink subframe, a downlink subframe, and a special subframe are configured for each subframe in a frame by using a higher layer signal. However, this method has a problem in that it is difficult to allocate resources efficiently when downlink and uplink traffic amounts change dynamically.

SUMMARY OF THE INVENTION

The present invention provides a method and apparatus for scheduling capable of effectively coping with a change in uplink and downlink traffic in a wireless communication system, that is, a time division duplex (TDD) system.

According to one aspect of the present invention, a method for scheduling in a wireless communication system is provided. The method includes: transmitting frame configuration information which configures each of subframes in a frame to any one of a default subframe and a flexible subframe; transmitting scheduling information for scheduling the configured flexible subframe; and transmitting and receiving a signal based on the scheduling information in the configured flexible subframe, wherein the default subframe is a subframe of which a transmission direction is fixed, and wherein the configured flexible subframe is used as an uplink subframe or a downlink subframe according to the scheduling information.

In the aforementioned aspect of the present invention, the default subframe may include a permanence subframe used in an initial access of a user equipment and a non-permanence subframe semi-statically configured by using a higher layer signal.

In addition, the frame configuration information may be transmitted through a radio resource control (RRC) message.

In addition, if a plurality of default subframes are configured in the frame, the plurality of default subframes may be configured in the order of a default uplink subframe used in uplink transmission of a user equipment and a default downlink subframe used in downlink reception of the user equipment.

In addition, subframes configured to the default subframe may include a subframe for transmitting a synchronous signal and a subframe for transmitting a broadcast signal.

In addition, if the frame consists of 10 subframes and is indexed from 0 to 9 in sequence, subframes configured to a default downlink subframe in the frame may be a subframe #0 and a subframe #5.

In addition, if the frame consists of 10 subframes and is indexed from 0 to 9 in sequence, subframes configured to a default special subframe in the frame may be a subframe #1 and a subframe #6, wherein the default special subframe includes a downlink pilot time slot (DwPTS), a guard period (GP), and an uplink pilot time slot (UpPTS).

In addition, if the frame consists of 10 subframes and is indexed from 0 to 9 in sequence, subframes configured to a default uplink subframe in the frame may be a subframe #3 and a subframe #8.

In addition, subframes configured to a flexible subframe in the frame may be subframes excluding subframes configured to the default subframe in the frame.

In addition, subframes configured to a flexible subframe in the frame may be configured to an uplink subframe in sequence starting from a flexible subframe adjacent before the default subframe.

In addition, if three or more flexible subframes are consecutive in the frame, a downlink subframe, a blank subframe, and an uplink subframe may be configured in that order by using corresponding scheduling information.

In addition, if the scheduling information is a downlink grant for scheduling a physical downlink shared channel (PDSCH), the configured flexible subframe may be used as a downlink subframe, and if the scheduling information is an uplink grant for scheduling a physical uplink shared channel (PUSCH), the configured flexible subframe may be used as an uplink subframe.

According to another aspect of the present invention, a method of operating a user equipment in a wireless communication system is provided. The method includes: receiving frame configuration information which configures each of subframes in a frame to any one of a default subframe and a flexible subframe; receiving scheduling information for scheduling the configured flexible subframe;

and transmitting and receiving a signal based on the scheduling information in the configured flexible subframe, wherein the default subframe is a subframe of which a transmission direction is fixed, and wherein the configured flexible subframe is used as an uplink subframe or a downlink subframe according to the scheduling information.

According to another aspect of the present invention, a user equipment is provided. The user equipment includes: a radio frequency (RF) unit for transmitting and receiving a radio signal; and a processor coupled to the RF unit, wherein the processor is configured for: receiving frame configuration information which configures each of subframes in a frame to any one of a default subframe and a flexible subframe; receiving scheduling information for scheduling the configured flexible subframe; and transmitting and receiving a signal based on the scheduling information in the configured flexible subframe, wherein the default subframe is a subframe of which a transmission direction is fixed, and wherein the configured flexible subframe is used as an uplink subframe or a downlink subframe according to the scheduling information.

According to the present invention, resources can be effectively allocated by actively coping with a change in uplink and downlink traffic in a time division duplex (TDD) system. Therefore, resource utilization efficiency of a system is increased.

BRIEF DESCRIPTION OF THE DRAWINGS

FIG. 12 shows an example of a configuration rule applicable to a case where a default subframe is configured.

DETAILED DESCRIPTION OF THE INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing uplink and downlink transmission/reception by using different times at the same frequency band. The FDD performing uplink and downlink transmission/reception by using different frequency bands. The wireless communication system can perform communication by using a radio frame.

Figure 1:
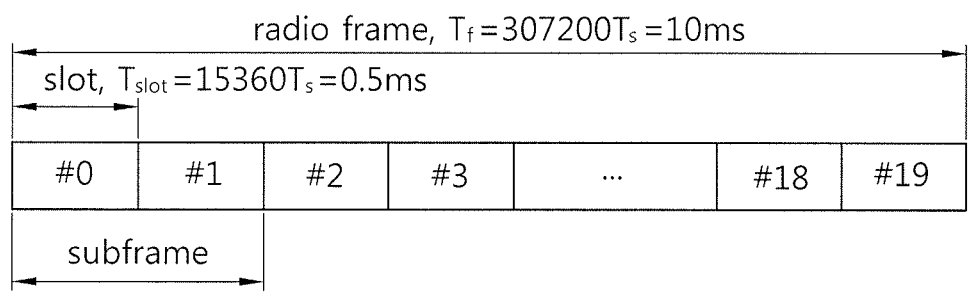
FIG. 1 shows a structure of a frequency division duplex (FDD) radio frame.

FIG. 1 shows a structure of an FDD radio frame.

The FDD radio frame (hereinafter, simply referred to as FDD frame) includes 10 subframes. One subframe includes two consecutive slots. Slots included in the FDD frame are indexed from 0 to 19. A time required to transmit one subframe is defined as a transmission time interval (TTI). The TTI may be a minimum scheduling unit. For example, one subframe may have a length of 1 milliseconds (ms), and one slot may have a length of 0.5 ms.

Figure 2:
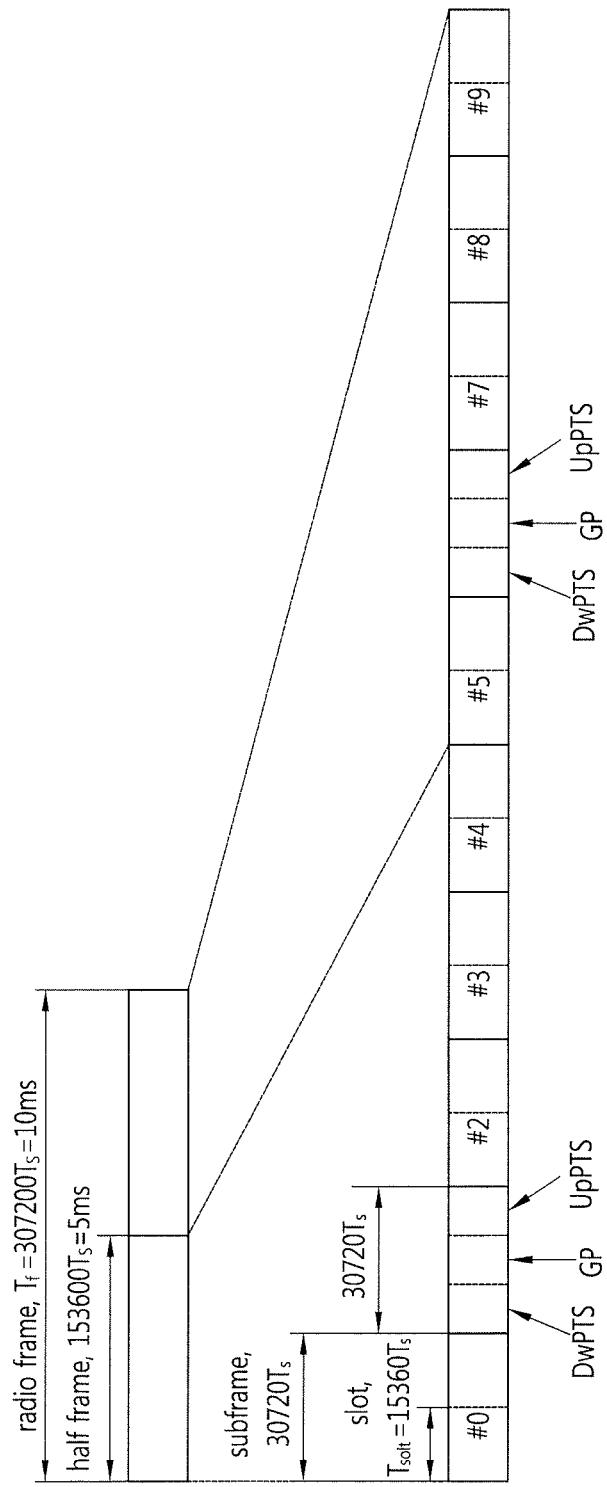
FIG. 2 shows a structure of a time division duplex (TDD) radio frame.

FIG. 2 shows a structure of a TDD radio frame.

Referring to FIG. 2, when a TDD radio frame (hereinafter, a TDD frame) is indexed starting from 0, a subframe having an index #1 and an index #6 is called a special subframe (simply referred to as an S subframe), and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink. The GP and the UpPTS take a role of a time gap.

In a TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, 'D' denotes a DL subframe, 'U' denotes a UL subframe, and 'S' denotes a special subframe. Upon receiving the DL-UL configuration from the BS, the UE can know whether each subframe is a DL subframe or a UL subframe in the TDD subframe. Hereinafter, the UL-DL configuration N (where N is any one value ranges from 0 to 6) may be found in Table 1 above.

The aforementioned FDD frame structure, TDD frame structure, and DL-UL configuration may be found in the section 4 of 3GPP TS 36.211 V9.1.0(2010-03).

Figure 3:
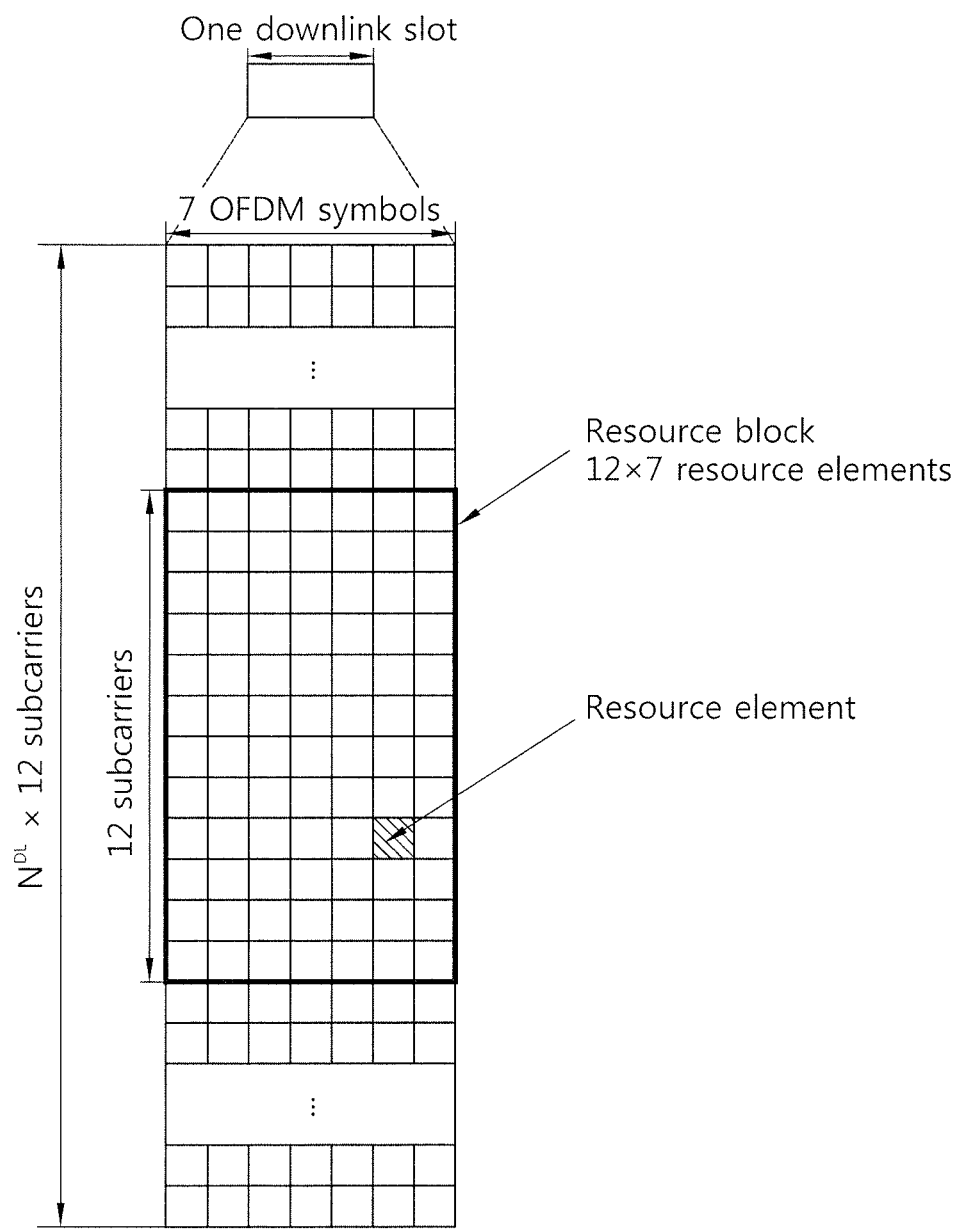
FIG. 3 shows an example of a resource grid for one downlink (DL) slot.

FIG. 3 shows an example of a resource grid for one DL slot.

Referring to FIG. 3, the DL slot includes a plurality of OFDM symbols in a time domain, and includes $N_{RB}$ resource blocks (RBs) in a frequency domain. The RB is a resource allocation unit, and includes one slot in the time domain and includes a plurality of subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described in FIG. 3 that one resource block includes 7×12 REs consisting of 7 OFDM symbols in the time domain and 12 subcarriers in the frequency domain for example, the number of OFDM symbols and the number of subcarriers in the resource block are not limited thereto. The number of OFDM symbols and the number of subcarriers may change variously depending on a cyclic prefix (CP) length, a frequency spacing, etc. For example, if the CP length corresponds to an extended CP, the resource block includes 6 OFDM symbols. The number of subcarriers in one OFDM symbol may be selected from 128, 256, 512, 1024, 1536, and 2048.

Figure 4:
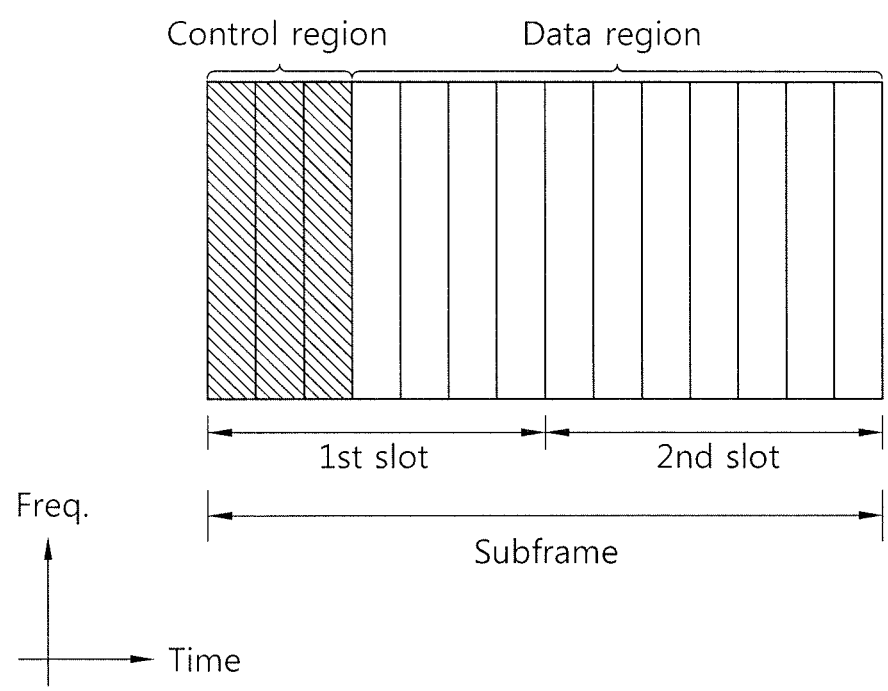
FIG. 4 shows a structure of a DL subframe.

FIG. 4 shows a structure of a DL subframe.

Referring to FIG. 4, the DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{St}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first 4 OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

Figure 5:
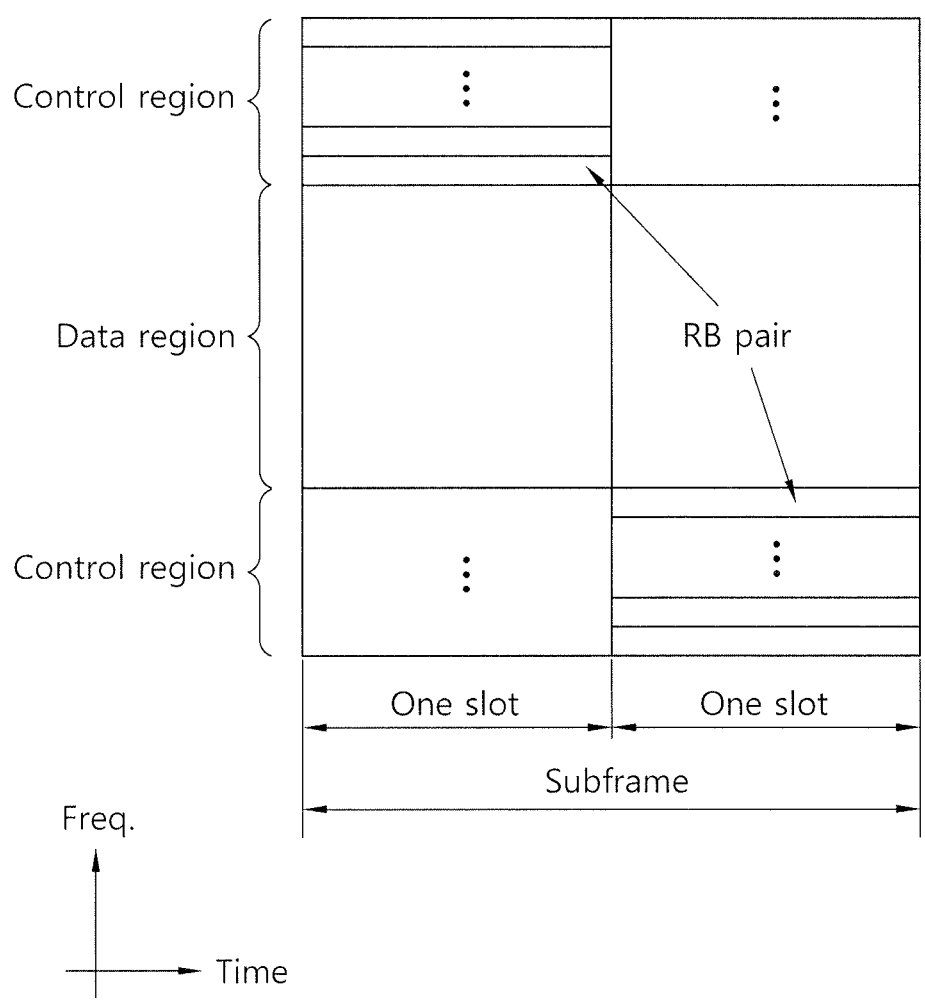
FIG. 5 shows a structure of an uplink (UL) subframe.

FIG. 5 shows a structure of a UL subframe.

Referring to FIG. 5, the UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. The RB pair has the same RB index m.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this case, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n)=e^{jb(n)\pi/4} \quad \text{[Equation 1]}$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), \quad \text{[Equation 2]}$$
$$0 \leq I_{cs} \leq N-1$$

In Equation 2, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Figure 6:
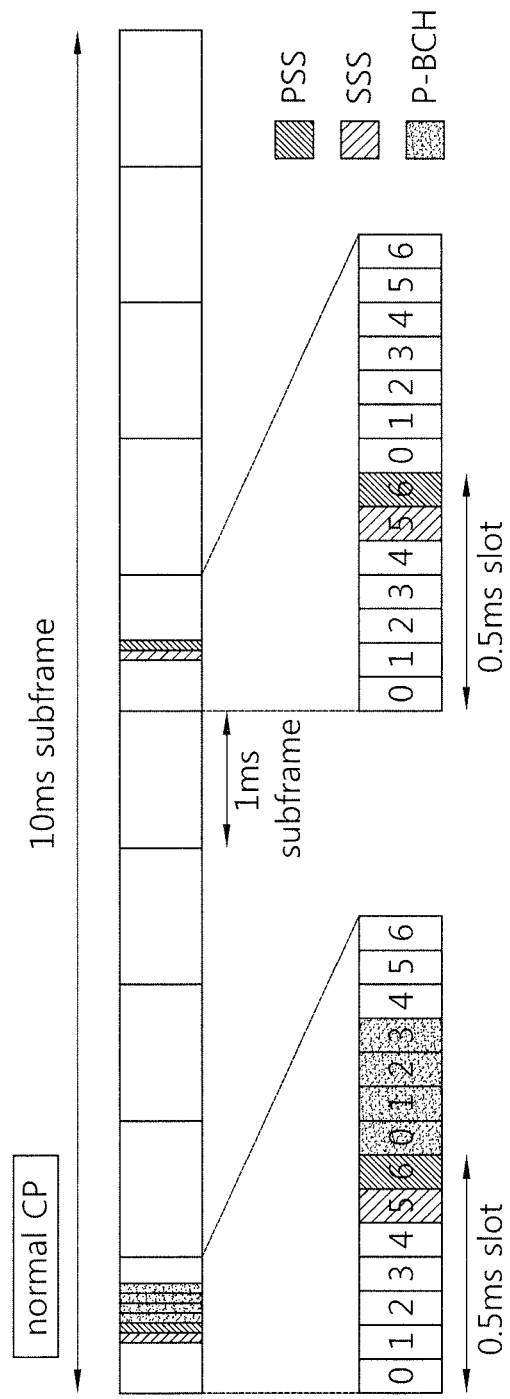
FIG. 6 and FIG. 7 show a frame structure for synchronization signal transmission in an FDD frame.
Figure 7:
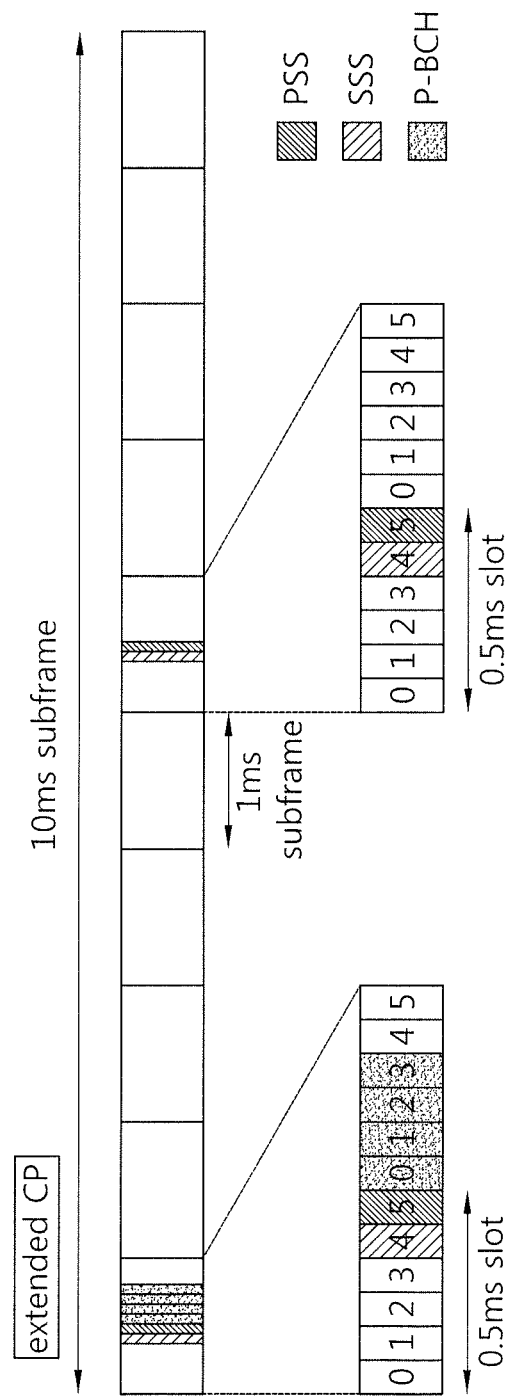

FIG. 6 and FIG. 7 show a frame structure for synchronization signal transmission in an FDD frame. FIG. 6 relates to a normal CP, and FIG. 7 relates to an extended CP. A slot number and a subframe number start from 0.

Herein, a synchronization signal is a signal used when cell search is performed, and includes a primary synchronization signal (PSS) and a secondary synchronization signal (SSS).

Referring to FIG. 6 and FIG. 7, the synchronization signal can be transmitted in each of subframes 0 and 5 by considering a global system for mobile communication (GSM) frame length of 4.6 ms to facilitate inter-RAT measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol. The synchronization signal can transmit 504 physical cell IDs by combining 3 PSSs and 168 SSSs. A physical broadcast channel (PBCH) is transmitted in first 4 OFDM symbols of a $1^{st}$ slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

A transmit diversity scheme of the synchronization signal uses only a single antenna port, and is not separately defined in the standard. That is, single antenna transmission or UE-transparent transmission (e.g., precoding vector switching (PVS), time switched transmit diversity (TSTD), cyclic delay diversity (CDD)) can be used.

For the PSS, a length-63 Zadoff-Chu (ZC) sequence is defined in a frequency domain and is used as a sequence of the PSS. The ZC sequence is defined by Equation 3. A sequence element corresponding to a DC subcarrier, i.e., n=31, is punctured. In Equation 3, Nzc=63.

$$d_u(n) = e^{-j\frac{\pi u n(n+1)}{N_{ZC}}} \quad \text{[Equation 3]}$$

Among 6 RBs (i.e., 72 subcarriers), 9 remaining subcarriers are always transmitted with a value of '0', which facilitates a filter design for performing synchronization. To define 3 PSSs, u=25, 29, and 34 are used in Equation 3. In this case, since 29 and 34 have a conjugate symmetry relation, two correlations can be simultaneously performed. Herein, the conjugate symmetry implies the relation of Equation 4 below, and by using this characteristic, a one-shot correlator can be implemented for u=29, 34, and an overall computation amount can be decreased by about 33.3%.

$$d_u(n)=(-1)^n(d_{N_{ZC}-u}(n))^*, \text{ when } N_{ZC} \text{ is even number.}$$
$$d_u(n)=(d_{N_{ZC}-u}(n))^*, \text{ when } N_{ZC} \text{ is odd number.} \quad \text{[Equation 4]}$$

A sequence used for the SSS is used by interleaving two m-sequences having a length of 31. The SSS can transmit 168 cell group IDs by combining two sequences. An m-sequence used as a sequence of the SSS is robust to a frequency selective environment, and can decrease a computation amount according to a fast m-sequence transform using a fast Hadamard transform. In addition, it is proposed to configure the SSS by using two short codes in order to decrease a computation amount of the UE.

Figure 8:
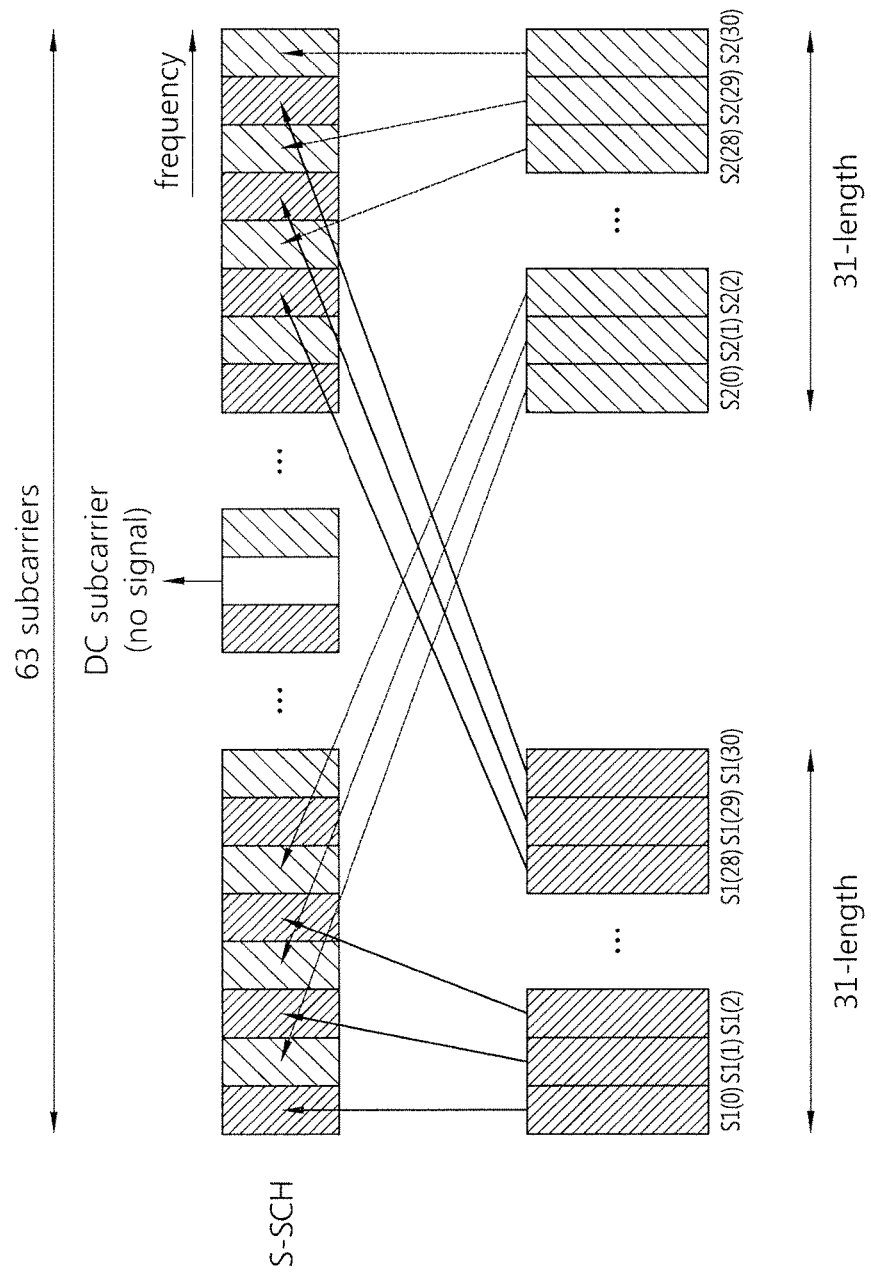
FIG. 8 shows a case where two sequences in a logic domain are interleaved and mapped in a physical domain.

FIG. 8 shows a case where two sequences in a logic domain are interleaved and mapped in a physical domain.

Referring to FIG. 8, when two m-sequences used to generate an SSS code are respectively defined by S1 and S2, if an SSS of a subframe 0 transmits a cell group ID by combining the two sequences (S1, S2), an SSS of a subframe 5 is transmitted by swapping to (S2, S1), thereby being able to identify a boundary of 10 m frame. The SSS code used herein uses a generator polynomial of $x^5+x^2+1$, and 31 codes can be generated by using different circular shifts.

To improve reception performance, two different PSS-based sequences are defined and then are scrambled to an SSS such that different sequences are scheduled to S1 and S2. Thereafter, an S1-based scheduling code is defined, and scheduling is performed on S2. In this case, a code of the SSS is swapped in a unit of 5 ms, whereas the PSS-based scrambling code is not swapped. The PSS-based scrambling code can be defined as a version of 6 circular shifts according to an index of PSS at an m-sequence generated from a generator polynomial of $x^5+x^3+1$. The S1-based scrambling code can be defined as a version of 8 circular shifts according to an index of S1 at an m-sequence generated from a generator polynomial of $x^5+x^4+x^2+x^1+1$.

Figure 9:
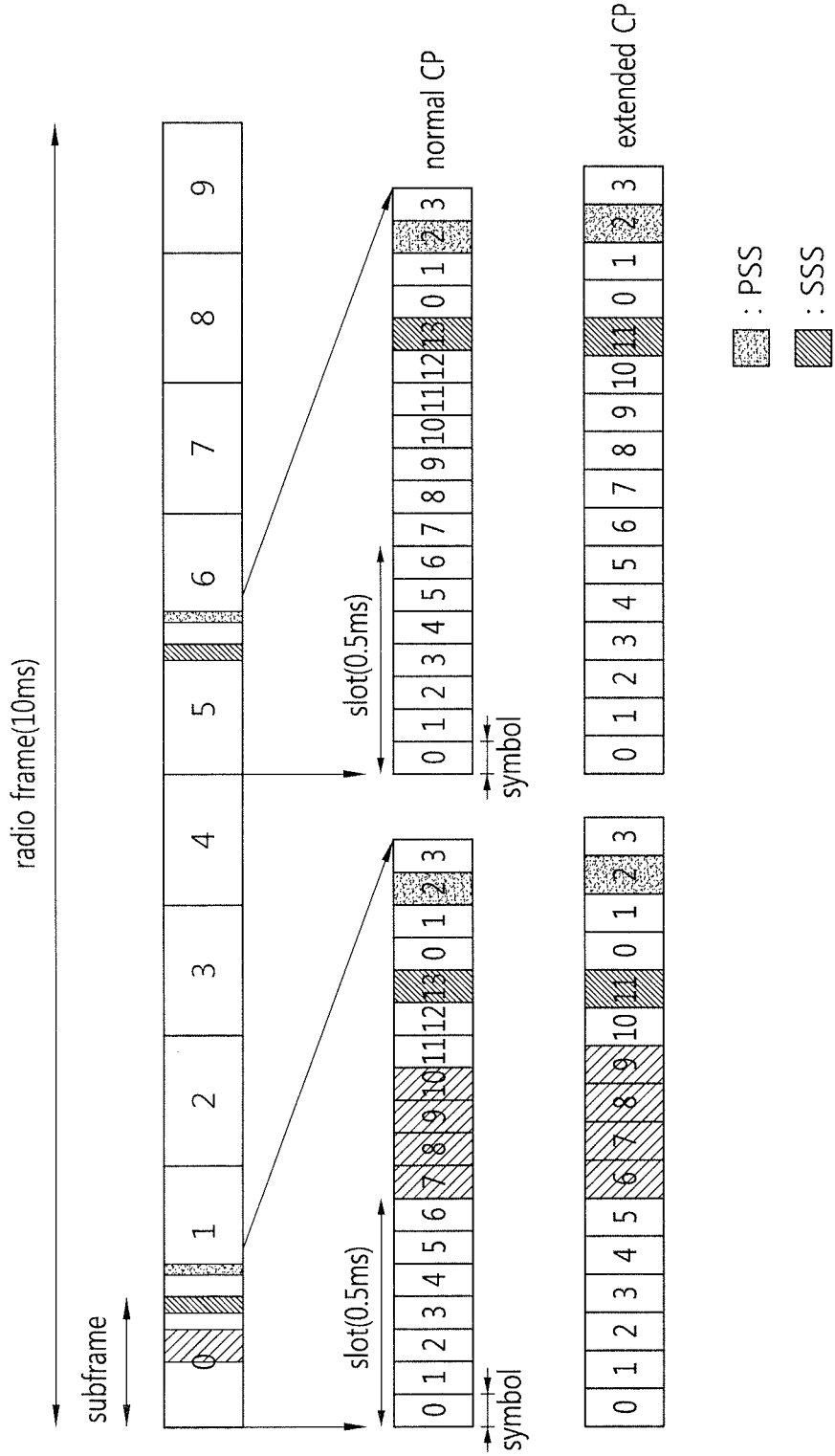
FIG. 9 shows a frame structure for transmitting a synchronous signal in TDD.

FIG. 9 shows a frame structure for transmitting a synchronous signal in TDD.

In a TDD frame, a PSS is transmitted in a $3^{rd}$ OFDM symbol of $3^{rd}$ and $13^{th}$ slots. An SSS is transmitted three OFDM symbols before the OFDM symbol in which the PSS is transmitted. A PBCH is transmitted in first 4 OFDM symbols of a $2^{nd}$ slot of a $1^{st}$ subframe.

Now, hybrid automatic repeat request (HARQ) will be described.

In general, in an uplink, a BS schedules one or more resource blocks to a selected UE according to a determined scheduling rule, and the UE transmits data by using an allocated resource in the uplink. If an error occurs after data is transmitted, for example, if the data is damaged or is not received by a receiving side, a method of correcting the error includes an automatic repeat request (ARQ) method and, as a more advanced method, a hybrid ARQ method. Basically, in the ARQ method, a transmitting side transmits one transmission unit (e.g., a subframe, a codeword, a transmission block, a frame, etc.) and thereafter waits to receive a confirmation message (i.e., ACK). The confirmation message (i.e., ACK) is sent only when the transmission unit is properly received in a receiving side. If an error occurs in the transmission unit, a negative-ACK or not-acknowledgement (NACK) message is sent, and information of the erroneous transmission unit is deleted from a buffer in the receiving side. When an ACK signal is received in the transmitting side, a transmission unit is transmitted thereafter, whereas when a NACK message is received, a transmission unit is retransmitted.

Unlike the ARQ method, in the HARQ method, if the received transmission unit cannot be demodulated, the receiving side transmits a NACK message to the transmitting side, but stores the received transmission unit in the buffer for a specific time period so that it is combined with the previously received transmission unit when the transmission unit is retransmitted, thereby increasing a reception success rate. Recently, the HARQ method which is more effective than the basic ARQ method is more widely used. There are various types of HARQ methods. The HARQ can be roughly classified into a synchronous HARQ and an asynchronous HARQ, and according to whether a channel state is considered for an amount of resources used in retransmission, can be classified into a channel-adaptive scheme and a channel-non-adaptive scheme.

In the synchronous HARQ scheme, when initial data transmission fails, subsequent data retransmission is performed at a timing determined by a system. For example, the timing at which data retransmission is performed can be performed at a $4^{th}$ time unit (i.e., subframe) after receiving an initial transmission failure signal. In this case, there is no need to additionally report retransmission time since it is pre-agreed between a BS and a UE, and if a data transmitting side receives a NACK message, data is retransmitted at a subframe of a next agreed timing. For example, it may be agreed such that data is to be retransmitted at a $4^{th}$ subframe after receiving NACK. Retransmission may be repeated until ACK is received instead of NACK. However, in order to regulate a resource allocation for retransmission in the synchronous HARQ scheme, a modulation scheme, etc., a control channel including scheduling information thereof may also be transmitted.

On the other hand, in the asynchronous method, even if an ACK/NACK response exists, retransmission may not be immediately achieved based thereon. Instead, a retransmission timing may be newly scheduled or may be achieved through additional signaling. A timing at which retransmission is achieved for previously failed data transmission may vary depending on several factors such as a channel state, etc.

In the channel-non-adaptive HARQ scheme, a data modulation scheme used in retransmission or the number of resource blocks in use is determined as determined in initial transmission. Unlike this, in the channel-adaptive HARQ scheme, the data modulation scheme, the number of resource blocks, etc., vary depending on a channel state. For example, in the channel-non-adaptive HARQ scheme, a transmitting side transmits data by using 6 resource blocks in initial transmission, and the 6 resource blocks are also used in retransmission. On the other hand, in the channel adaptive HARQ scheme, even if transmission is achieved initially by using the 6 resource blocks, retransmission is achieved at a later time by using more (or less) than 6 resource blocks according to a channel state.

According to this classification, four HARQ combinations can be achieved. Examples of an HARQ scheme used in general include an asynchronous and channel-adaptive HARQ scheme and a synchronous and channel-non-adaptive HARQ scheme. The asynchronous and channel-adaptive HARQ scheme can maximize retransmission efficiency by adaptively varying a retransmission timing and an amount of resources in use according to a channel state, but is not considered in general for an uplink since there is a disadvantage in that a signaling overhead is increased. Meanwhile, the synchronous and channel-non-adaptive HARQ scheme has an advantage in that there is almost no signaling overhead since a retransmission timing and a resource allocation are agreed in a system, but has a disadvantage in that retransmission efficiency is decreased when it is used in a channel state which varies significantly.

At present, the 3GPP LTE uses the asynchronous HARQ scheme in a downlink case and uses a synchronous HARQ scheme in an uplink case.

Figure 10:
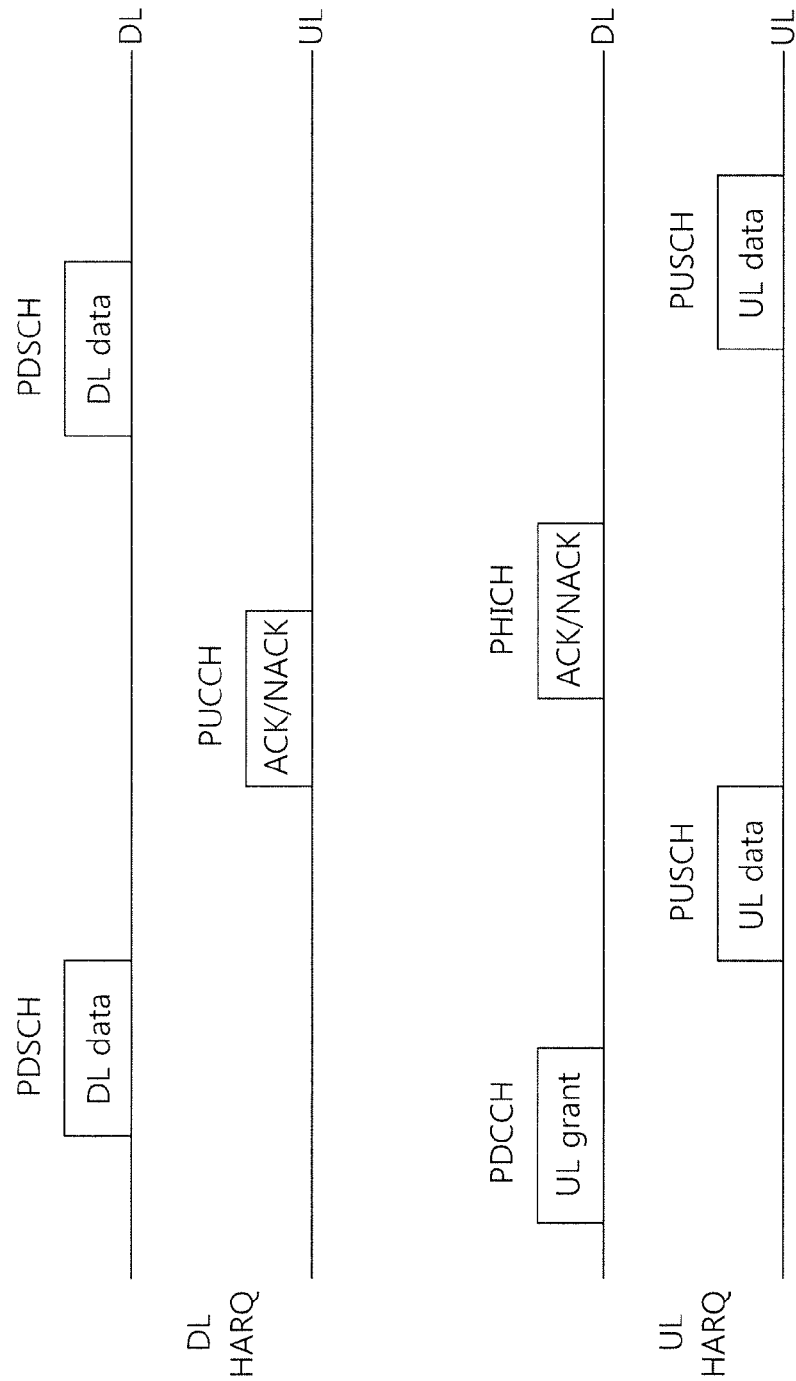
FIG. 10 shows an example of a DL uplink hybrid automatic repeat request (HARQ) and a UL HARQ performed in an FDD system.

FIG. 10 shows an example of a downlink (DL) HARQ and an uplink (UL) HARQ performed in an FDD system.

Referring to FIG. 10, in case of the DL HARQ, a BS transmits DL data through a PDSCH, and after four subframes elapse, a UE transmits ACK/NACK for the DL data through a PUCCH. In this case, optionally, ACK/NACK can be transmitted through the PUSCH. Then, according to the ACK/NACK, the BS may retransmit the DL data or may transmit new DL data through the PDSCH.

In case of the UL HARQ, the BS transmits a UL grant through a PDCCH. The UE transmits UL data through a PUSCH after four subframes elapse, and the BS transmits ACK/NACK through a PHICH after four subframes elapse. Upon receiving NACK, the UE may retransmit the UL data after four subframes elapse. Autonomous retransmission implies that, if a PHICH response is NACK after PUSCH transmission, a PUSCH is retransmitted using previously agreed resources (i.e., resources allocated using a previous UL grant) even if a UL grant does not exist. PUSCH retransmission may be indicated by a UL grant, and in this case, it follows an indication of the UL grant irrespective of PHICH reception information.

Now, the present invention will be described.

In a next-generation wireless communication system, an unlicensed band (ULB) may be used for utilization of more effective frequency resources, or different types of frames (i.e., a TDD frame or an FDD frame) may be used for each of a plurality of carriers (or serving cells) allocated to the same UE. In addition, even if the TDD frame is used by all of the plurality of carriers allocated to the same UE, a different UL-DL configuration can be used for each carrier. Alternatively, it is also considered a method of using a new type of carrier (called a new carrier type (NCT)) to reduce an overhead of a common control channel provided for backward compatibility in each carrier and to support low-spec, low-cost UE (such a UE is also called a machine type communication (MTC) UE). The new type of carrier does not consider backward compatibility.

In an LTE system, there are an FDD frame used in an FDD system and a TDD frame used in a TDD system. In the FDD frame, subframes are always present in a 1:1 manner at the same time in an uplink and a downlink. On the other hand, in the TDD frame, a subframe ratio is not always 1:1 in an uplink and a downlink. That is, a ratio of a downlink subframe to an uplink subframe differs depending on a UL-DL configuration. Therefore, in case of using the TDD frame, if traffic does not rapidly change in the uplink and the downlink, frequency resources can be effectively used through a method of using a UL-DL configuration in which downlink subframes are present in a greater number or a UL-DL configuration in which more uplink subframes are present according to traffic.

However, in the TDD system, a UL-DL configuration is not dynamically set, but is semi-statically set through a higher-layer signal. That is, subframes in a TDD frame are configured as a UL subframe, a DL subframe, an S subframe, etc., and a significant time delay exists in a reconfiguration process. If there is an HARQ process which is already under way, it needs to wait for ending or to end the HARQ process. Therefore, if traffic changes rapidly, it is difficult to change the UL-DL configuration adaptively, which causes a problem in that an effective use of a radio resource is difficult.

Therefore, the present invention proposes a method capable of dynamically determining whether UL/DL is applied for a subframe in a TDD frame. Although the present invention can be used to configure a specific subframe to a UL subframe or a DL subframe in the TDD frame, the present invention is not limited thereto. For example, it can also be used for a UE which operates in a half-duplex manner in an FDD system using an FDD frame. The UE which operates in the half-duplex manner implies a UE which can perform any one of uplink transmission and downlink transmission at a specific time. In the FDD system, a downlink subframe and an uplink subframe use different frequency resources, and thus an interference is not generated even if uplink transmission and downlink transmission are performed simultaneously in principle. However, if only one amplifier is provided similarly to a half-duplex UE, the UE can perform only any one of uplink transmission and downlink reception. Therefore, the half-duplex UE operates as if a specific subframe in an FDD frame is used by configuring it to any one of an uplink subframe and a downlink subframe. Therefore, the present invention is also applicable to a case where the half-duplex UE operates in the FDD system. In addition, although it is described hereinafter that a control channel transmitted in a downlink by a BS is a PDCCH for example, the present invention is not limited thereto. That is, the control channel transmitted in the downlink by the BS may be an enhanced-PDCCH (e-PDCCH). The e-PDCCH implies a control channel configured to a PDSCH region. The e-PDCCH may be a control channel which cannot recognize a legacy UE operating in the legacy LTE system but can recognize an advanced UE operating in an advanced system such as LTE-A. In the e-PDCCH, a reference signal which is not used by the legacy UE may be used. The advanced UE can receive a control signal by using a reference signal which is not used by the legacy UE in the e-PDCCH.

Figure 11:
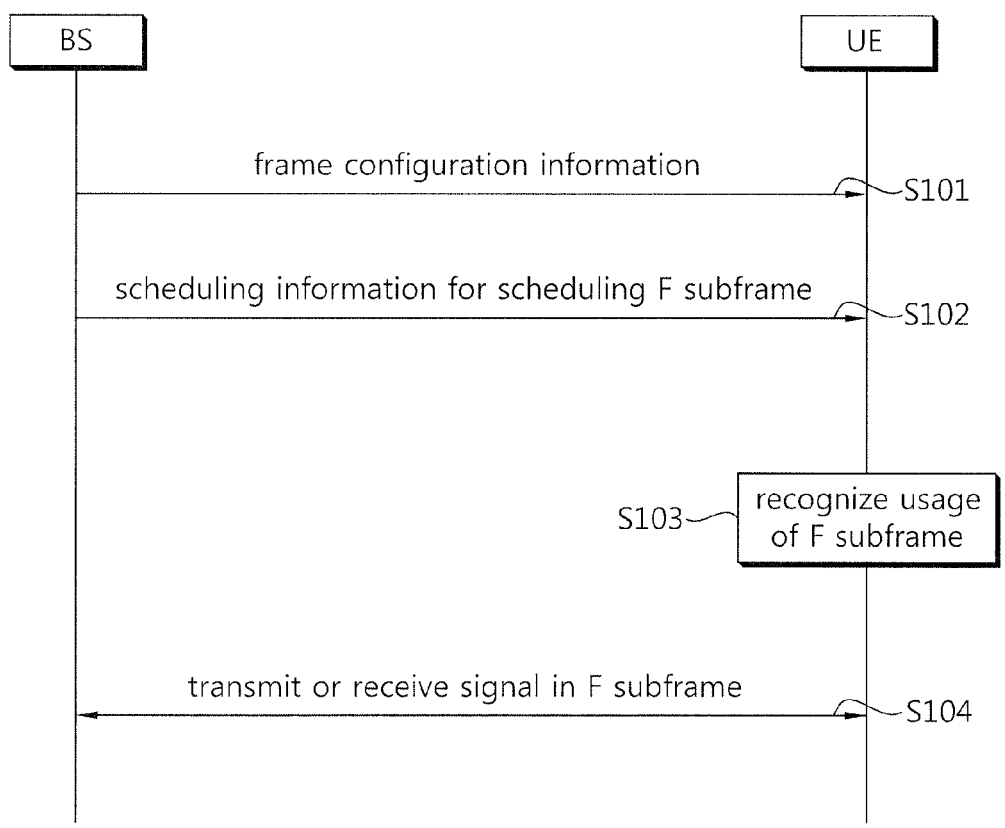
FIG. 11 shows a communication method of a user equipment (UE) according to an embodiment of the present invention.

FIG. 11 shows a communication method of a UE according to an embodiment of the present invention.

Referring to FIG. 11, a BS transmits frame configuration information to a UE (step S101).

The frame configuration information is information for configuring subframes in one or more predetermined frames to a default subframe or a flexible subframe (hereinafter, simply referred to as an F subframe).

The default subframe implies a subframe which is fixedly used as a UL subframe, a DL subframe, or an S subframe. The default subframe can be classified into a default DL subframe, a default UL subframe, and a default S subframe according to its usage or transmission direction. For example, in a TDD frame, subframes #0 and #5 (or a subframe #0 alone) may be a default DL subframe. In addition, in the TDD frame, subframes #1 and #6 (or a subframe #1 alone) may be a default S subframe.

It is considered herein that a PBCH is transmitted in the subframe #0, an SSS is transmitted in subframes #0 and #5, and a PSS is transmitted in subframes #1 and #6, and according to a DL-UL switching period in the UL-DL configuration of Table 1, a subframe used as an S subframe is the subframes #1 and #6 in case of a 5 msec period and is the subframe #1 in case of a 10 msec period. In addition, the subframe #3 and #7 (of the subframe #3 alone) may be a default UL subframe. It is considered herein that, in the UL-DL configuration of Table 1, according to the DL-UL switching period, the subframes #3 and #7 are always used as a UL subframe in case of the 5 msec period, and the subframe #3 is always used as a UL subframe in case of the 10 msec period.

The default subframe can be divided into a permanent subframe (hereinafter, a P subframe) and a non-permanent subframe according to a permanency of the configuration. The P subframe is a subframe which has a fixed location pre-agreed in a frame and of which a transmission direction/usage is determined. For example, the P subframe may be a subframe in which a synchronous signal is transmitted and a subframe in which a PBCH is transmitted. The P subframe can be used for initial access to a network of a UE. This is because the UE can receive the synchronous signal, the PBCH, etc., since the location and usage of the P subframe is pre-known. The P subframe can be divided into a P DL subframe and a P UL subframe according to the transmission direction.

The non-permanence subframe implies a subframe of which the location or usage is semi-statically determined in a specific frame duration by a configuration of a BS. The non-permanence subframe can be configured by using a higher layer signal such as an RRC message or system information which is broadcast, and is different from the P subframe in a sense that it can be reconfigured by using the higher layer signal. The non-permanence subframe can also be divided into a non-permanence DL subframe and a non-permanence UL subframe according to the transmission direction.

The F subframe is any one of a UL subframe, a DL subframe, and an S subframe, and implies a subframe which can be configured dynamically and flexibly.

The BS can transmit frame configuration information through the P subframe. In other words, the BS can transmit the frame configuration information by inserting it to system information (i.e., MIB, SIB) transmitted in the P subframe or a UE-specific RRC signal. By using the frame configuration information, the UE can know which subframe is the non-permanence subframe or the F subframe in the frame.

In addition, the BS can instruct to release the configuration of the non-permanence subframe or the F subframe by using the frame configuration information. In this case, whether to release all default subframes excluding the P subframe or to release all F subframes can be signaled individually.

The BS transmits scheduling information for scheduling the F subframe to the UE (step S102).

Since the F subframe can be used as any one of the DL subframe, the UL subframe, and the S subframe, the BS needs to report for which usage the F subframe is used. In the present invention, the scheduling information is used for a dynamic configuration of the F subframe.

The UE can determine a usage of the F subframe according to a DCI format of a PDCCH for scheduling the F subframe. For example, a DCI format 0 is for PUSCH scheduling, and if the UE receives a DCI format 0 through a PDCCH for scheduling the F subframe, the F subframe is used as a UL subframe. In addition, the DCI format 1 is for PDSCH scheduling, and if the UE receives a DCI format 1 in a PDCCH for scheduling the F subframe, the F subframe is used as a DL subframe. As such, for the F subframe, its usage (i.e., for which usage it is used among a DL subframe, a UL subframe, and an S subframe) can be dynamically signaled. The scheduling information is called a grant. Scheduling information for scheduling the PDSCH is called a DL grant, and scheduling information for scheduling the PUSCH is called a UL grant.

The subframe configured to the UL subframe or the DL subframe does not necessarily require that one subframe is entirely used for UL transmission or DL transmission. That is, only some areas of the F subframe may be used. For example, in a situation where a first slot of the F subframe is used by being fixed for UL transmission (or DL reception), it can also be used for UL transmission (or DL reception) according to a transmission direction which is dynamically configured only for a second slot.

By receiving the DL grant, the F subframe which recognizes that it is used as a DL subframe can be optionally used as an S subframe. For example, even if the F subframe is configured as the S subframe, the F subframe can be configured as the S subframe if PDSCH transmission is possible.

If a usage cannot be specified for a reason that a PDCCH for scheduling the F subframe cannot be received or the like, the UE may perform no operation in the F subframe in the TDD system. In case of a UE operating in a half-duplex mode in the FDD system, DL reception is attempted if a usage of the F subframe cannot be known. This is because a DL subframe can always be used in the FDD system unlike the TDD system.

The UE recognizes the usage of the F subframe (step S103).

The BS and the UE perform signal transmission and reception in the F subframe (step S104).

Now, a configuration rule will be described when a default subframe is configured in a frame.

Figure 12:
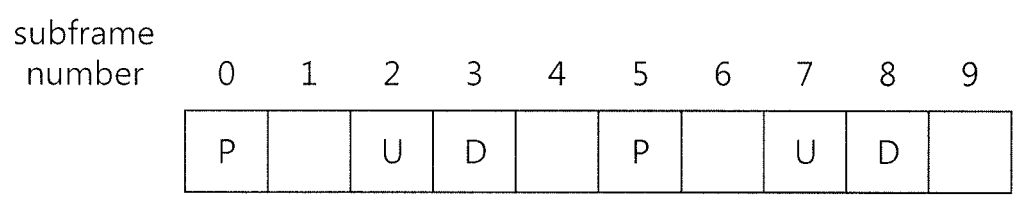

FIG. 12 shows an example of a configuration rule applicable to a case where a default subframe is configured.

Referring to FIG. 12, subframes #0 and #5 are P subframes. Assume that subframes #2, #3, #7, and #8 are non-permanence subframes. In this case, the non-permanence subframes can be configured in the order of a UL subframe (indicated by U in the figure) and a DL subframe (indicated by D in the figure) in a semi-static manner according to a higher layer signal.

As can be seen in Table 1 above, an S subframe always exists between a DL subframe and a UL subframe. In this case, the S subframe includes a time gap for avoiding an interference with another UE. Therefore, if it is intended to configure the non-permanence subframe in a frame in the order of the DL subframe and the UL subframe, the S subframe must be located between the DL subframe and the UL subframe, which results in ineffective utilization of resources. Accordingly, if the non-permanence subframe is configured, it can be configured in the order of the UL subframe and the DL subframe. Since the S subframe is unnecessary in this case, resources are effectively utilized.

Although only a process of configuring the non-permanence subframe is described in the above example, the present invention is not limited thereto. That is, the configuration rule following the order of the UL subframe and the DL subframe can also be applied between the non-permanence subframe and the P subframe. For example, a non-permanence UL subframe may be configured to be located before a P DL subframe.

The default subframe can be utilized for the following operation.

The BS can be configured such that a synchronous channel, a broadcast channel, system information, and a random access channel (RACH) response are transmitted only in the default DL subframe. Alternatively, on the contrary, a subframe in which the synchronous channel, the broadcast channel, the system information, and the RACH response are transmitted may be a default DL subframe.

The BS can restrict that CQI measurement, radio link quality measurement, periodic SRS transmission, and periodic CQI transmission are performed only through the default subframe. In general, the limitation is applied to the TDD system. The limitation is not applied to communication with the UE operating in the half-duplex mode in the FDD system since DL transmission can always be performed. Even if a subframe is not configured as a default subframe, if it is configured for UL transmission, it may be an effective DL subframe capable of DL measurement.

A UL subframe for CSI reporting with respect to a DL subframe of a serving cell must be configured by considering a preparation time for measuring and reporting CSI of the serving cell. For example, an offset of $n_{CQI\_REF,MIN}$ (e.g., 4) subframes may be required between a DL subframe for which CSI measurement is performed in the serving cell and a UL subframe for transmitting CSI for the DL subframe. In this case, the UL subframe for CSI reporting is configured to have an offset value greater than or equal to $n_{CQI\_REF,MIN}$ subframes from the DL subframe for which the CSI measurement is performed. In other words, the BS determines that an effective DL subframe located $n_{CQI\_REF,MIN}$ subframes before the UL subframe for CSI reporting is the subframe for which CSI measurement is performed.

The effective DL subframe may be determined among the following subframes.

1) A default DL subframe or 2) a subframe which is confirmed to be configured as a DL subframe among F subframes by a corresponding UE through dynamic signaling. It can be determined among subframes recognized as DL since a UL or DL subframe is gradually used due to the limited number of UL-DL switching attempts proposed in the present invention.

In addition, the effective DL subframe may have an additional limitation as follows among DL subframes satisfying the above condition.

i. It must not be an MBSFN subframe in a situation excluding a transmission mode 9.

ii. A specific-length S subframe of which a DL usage is not guaranteed is excluded. For example, an S subframe of which DwPTS is less than or equal to 7680 $T_S$ is excluded ($T_S$ has a relation of: $307200*T_S=10$ ms).

iii. It must not correspond to a measurement gap configured to a corresponding UE.

iv. In case of periodic CSI reporting, it must be a CSI subframe coupled to periodic CSI reporting if a CSI subframe group is configured.

The BS can restrict that semi-persistent scheduling and autonomous retransmission (PHICH transmission is necessary) of a synchronous HARQ process is performed only in the default subframe. That is, in the F subframe, retransmission of the synchronous HARQ process can be prohibited, and an operation of an asynchronous HARQ process can be allowed. In this case, preferably, PHICH transmission is not performed.

In addition, semi-static scheduling can be prohibited in the F subframe. Further, the number of retransmission attempts of the synchronous HARQ process is limited to L in the F subframe, and a UDS configuration can be maintained in a subframe corresponding to a retransmission period. If L=0, preferably, PHICH transmission is not performed.

The default DL subframe can be optionally used as the S subframe. For example, if a subframe immediately subsequent to the default DL subframe is used as a UL subframe, a time gap for switching a transmission direction from DL reception to UL transmission is required. To provide the time gap, the default DL subframe can be used as the S subframe. In the S subframe, there is a case where a PDCCH can be transmitted in a first portion of the time gap and a PDSCH can be partially transmitted. Without having to configure the default DL subframe, it is also possible to configure only a default UL subframe and a subframe including a default PDCCH region.

The default DL subframe or the default UL subframe may be optionally included in the S subframe. That is, if the S subframe has a fixed location, it can be used in replacement of the default DL subframe by configuring a resource region for performing a function of the default DL subframe before a time gap included in the S subframe. In addition, by configuring a resource region for performing a function of the default UL subframe after the time gap in the S subframe, it can be used in replacement of the default UL subframe. In other words, only the S subframe can be configured as the default subframe, and an F subframe can be configured based thereon.

Figure 13:
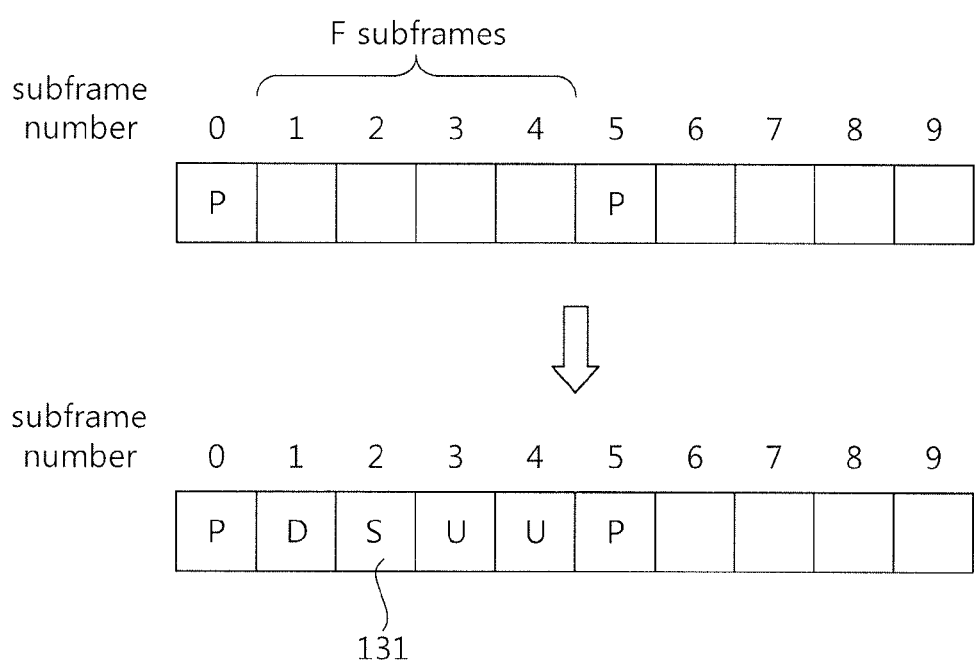
FIG. 13 shows an example of configuring a flexible (F) subframe to a DL subframe, a UL subframe, or a special (S) subframe.

FIG. 13 shows an example of configuring an F subframe to a DL subframe, a UL subframe, or an S subframe.

Referring to FIG. 13, in a frame, subframes #1, #2, #3, and #4 can be configured to the F subframe by using a higher layer signal (i.e., frame configuration information). In this case, a usage of each F subframe can be determined according to scheduling information of a PDCCH to be scheduled. In this case, if a certain F subframe is configured to the UL subframe, a subframe immediately before the UL subframe can be configured to an S subframe 131. In case of consecutive UL subframes, only a subframe immediately before a first UL subframe can be configured to the S subframe.

For example, usages of the subframes #1, #2, #3, and #4 which are configured to the F subframe can be determined to a DL subframe, an S subframe, a UL subframe, and a UL subframe, in that order.

In case of applying this rule, if a specific F subframe is configured to a UL subframe, the UE can operate under the assumption that the subframe immediately before the F subframe is the S subframe. Alternatively, if it is configured to the S subframe, the UE can operate by recognizing that an F subframe immediately after the S subframe is configured to a UL subframe. As such, if a configuration of the F subframe is associated with a configuration of a subframe before and after the F subframe, the BS does not have to report all of the F subframe and subframes before or after the F subframe, and reports only that the F subframe is configured to a UL subframe or an S subframe. Accordingly, an amount of information to be transmitted can be decreased, thereby decreasing a signaling overhead.

For another example, if consecutive F subframes are configured to consecutive UL subframes, the BS may configure only a first UL subframe to an S subframe.

Alternatively, if the BS configures a subframe such that an operation of the UE is switched from DL reception to UL transmission (i.e., if F subframes are configured to a DL subframe and a UL subframe, in that order), among F subframes between the DL subframe used in DL reception and the UL subframe used in UL transmission, an F subframe immediately before the UL subframe can be configured to a blank subframe in replacement of the S subframe. The blank subframe takes a role of constituting an indirect time gap, and for example, can be implemented to limit a schedule switching between a DL subframe and a UL subframe. The blank subframe can be utilized in such a manner that a specific number of first OFDM symbols in the block subframe are configured as a control channel region to be utilized in DL control channel transmission such as PCFICH, PDCCH, PHICH, etc., and a PDSCH region consisting of subsequent OFDM symbols is not used.

In the F subframe, the number of OFDM symbols in the PDCCH region or a PDSCH start OFDM symbol location (or an e-PDCCH start location) can be configured according to the following method.

1. A method of reporting a control format indicator (CFI) through an RRC message can be used. The CFI is an indicator for indicating the number of OFDM symbols constituting the PDCCH region. The RRC message may provide a CFI value for each F subframe in a frame or may report a CFI value common to all F subframes in the frame.

2. Method of utilizing PCFICH

The number of OFDM symbols of a PDCCH region or a PDSCH start OFDM symbol location of an F subframe may conform to a CFI value transmitted through a PCFICH of a previous default DL subframe closest in distance to the F subframe. Alternatively, a CFI value obtained through decoding can be used under the assumption that a PCFICH exists in the F subframe.

A PHICH/e-PHICH resource may not be configured in a PDCCH/e-PDCCH region of the F subframe. The e-PHICH is a downlink control channel for transmitting ACK/NACK to an advanced UE.

In order to decrease a case where an S subframe is generated among F subframes, the BS can limit the number of times of configuring the F subframes in the order of a DL subframe and a UL subframe. This can be expressed that switching of DL reception and UL transmission is limited to a specific number of times in terms of a UE operation. The number of times of attempting the switching may be limited to, for example, one or two in the frame.

Alternatively, the number of times of attempting the switching may be limited to one or two in F subframes between default subframes.

Figure 14:
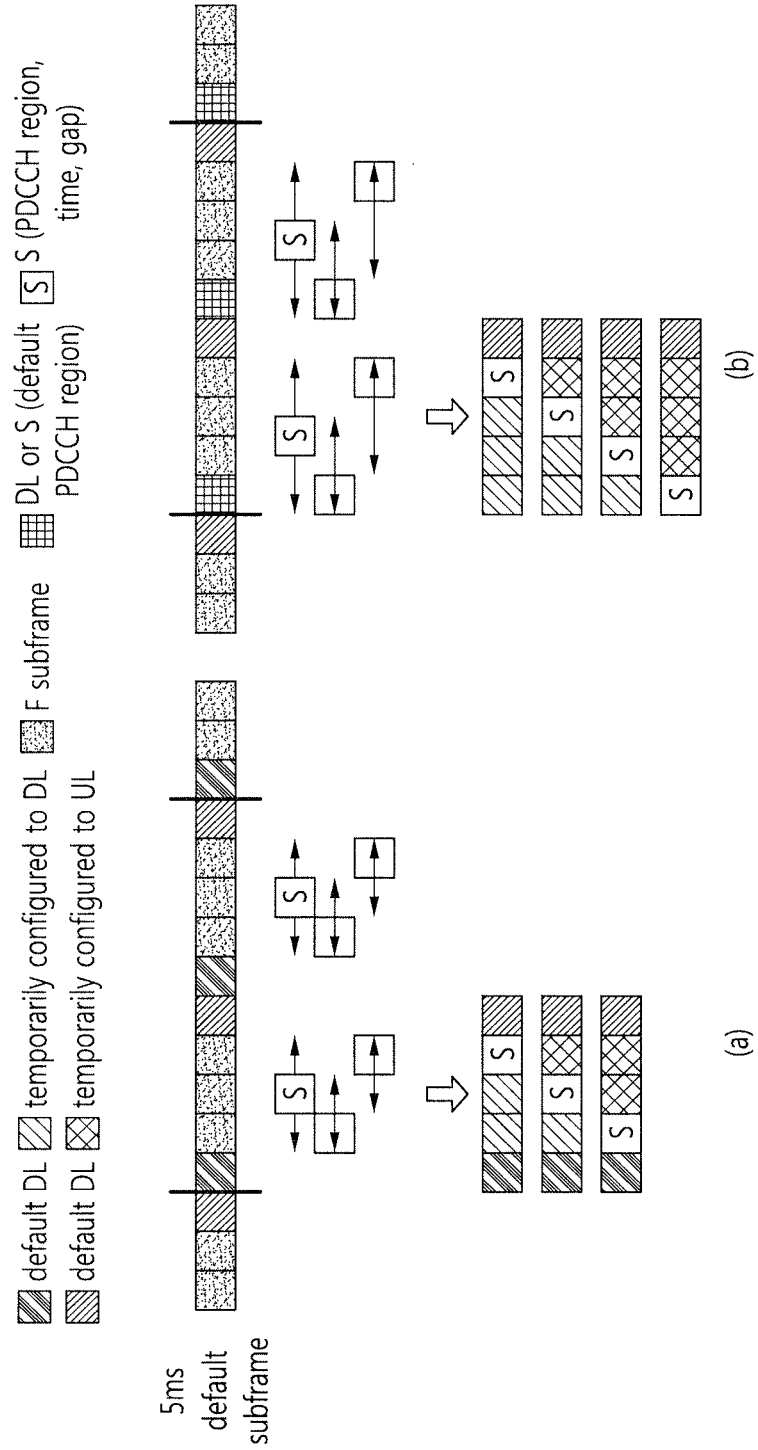
FIG. 14, including views (a) and (b), show an example in which F subframes are configured to DL/UL such that switching of a UE from DL reception to UL transmission occurs only one time in F subframes between default subframes.

FIG. 14, including views (a) and (b), shows an example in which F subframes are configured to DL/UL such that switching of a UE from DL reception to UL transmission occurs only one time in F subframes between default subframes.

Referring to FIG. 14, first, a default UL subframe and a default DL subframe are set to a 5 ms period. In this case, the default subframes are configured in the order of the default UL subframe and the default DL subframe. In addition, F subframes located between the default subframes are configured by selecting from a DL subframe, a UL subframe, and an S subframe (it is simply called a UL/DL configuration of the F subframe). In this case, the F subframes are configured in the order of the DL subframe, the S subframe, and the UL subframe so that switching of the UE from DL reception to UL transmission occurs only one time within the 5 ms period. The S subframe is generated only one time within the 5 ms period.

As such, in order to schedule the F subframes, the UL/DL configuration of the F subframes is gradually performed starting from an F subframe adjacent to the default subframe. From a perspective of a scheduled UE, only a DL subframe can be configured to previous F subframes with respect to the S subframe, and only a UL subframe can be configured to subsequent F subframes. In addition, among the F subframes, there may be a subframe to which either the DL subframe nor the UL subframe is configured. In this case, the UE recognizes F subframes before an F subframe configured to a DL subframe and after a default subframe as a DL subframe, and recognizes F subframes after an F subframe configured to a UL subframe and before the default subframe as UL subframes.

Figure 15:
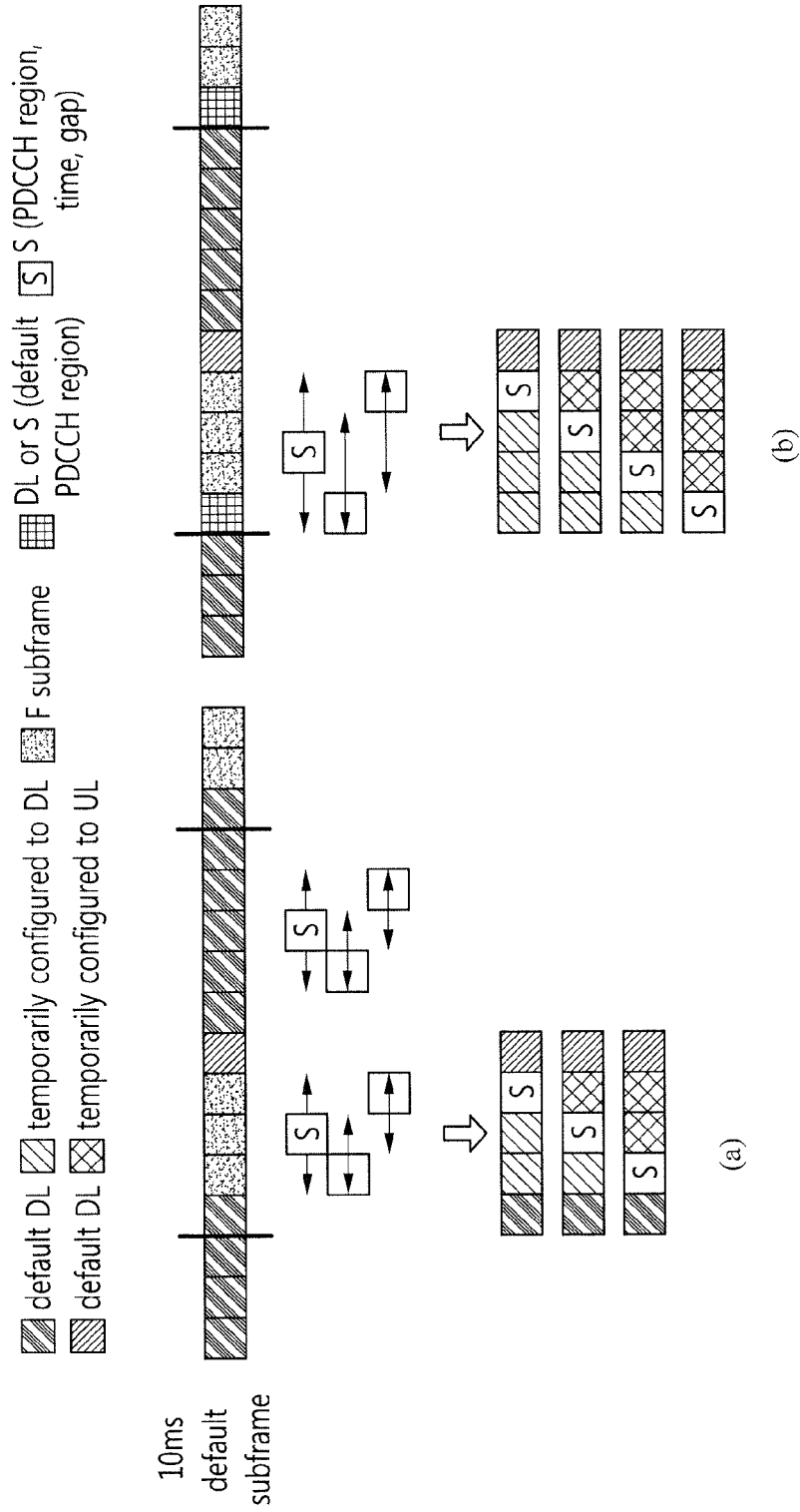
FIG. 15, including views (a) and (b), and FIG. 16, including views (a) and (b), show examples of configuring F subframes to a DL subframe, an S subframe, and a UL subframe, in that order, when default subframes are set to a 10 ms period.
Figure 16:
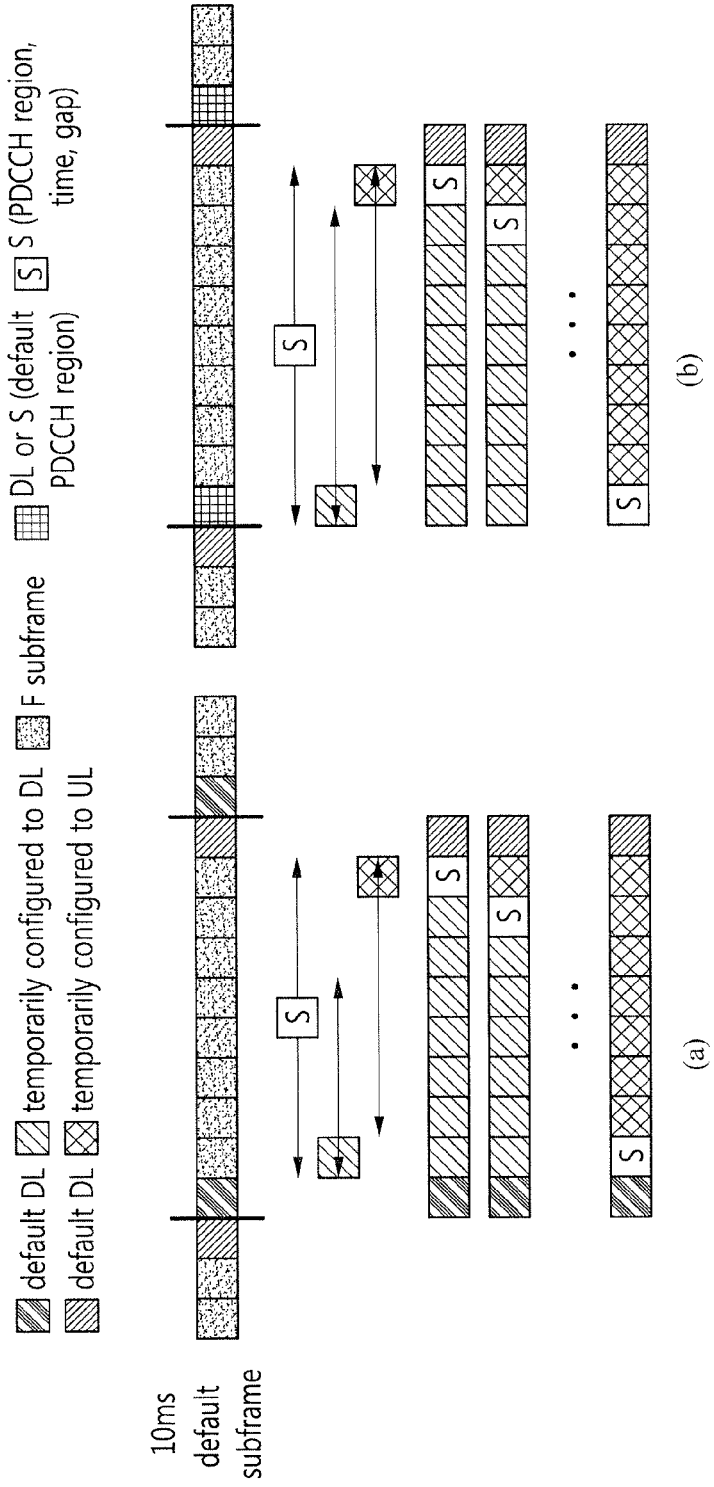

FIG. 15, including views (a) and (b), and FIG. 16, including views (a) and (b), show examples of configuring F subframes to a DL subframe, an S subframe, and a UL subframe, in that order, when default subframes are set to a 10 ms period.

FIG. 15 shows an example of a case where the number of default DL subframes is greater than the number of F subframes configured to a default UL subframe and a UL subframe. FIG. 16 shows a case of using only a default UL subframe and a subframe in which a default PDCCH region is guaranteed without a default DL subframe.

A UE operates by expecting that switching from DL reception to UL transmission occurs only one time in F subframes between default subframes. That is, it can be seen that, when an S subframe is recognized or an F subframe initially configured to a UL subframe is recognized, subsequent F subframes are not configured to a DL subframe. Therefore, it can be seen that the subsequent F subframes are configured to a UL subframe.

Figure 17:
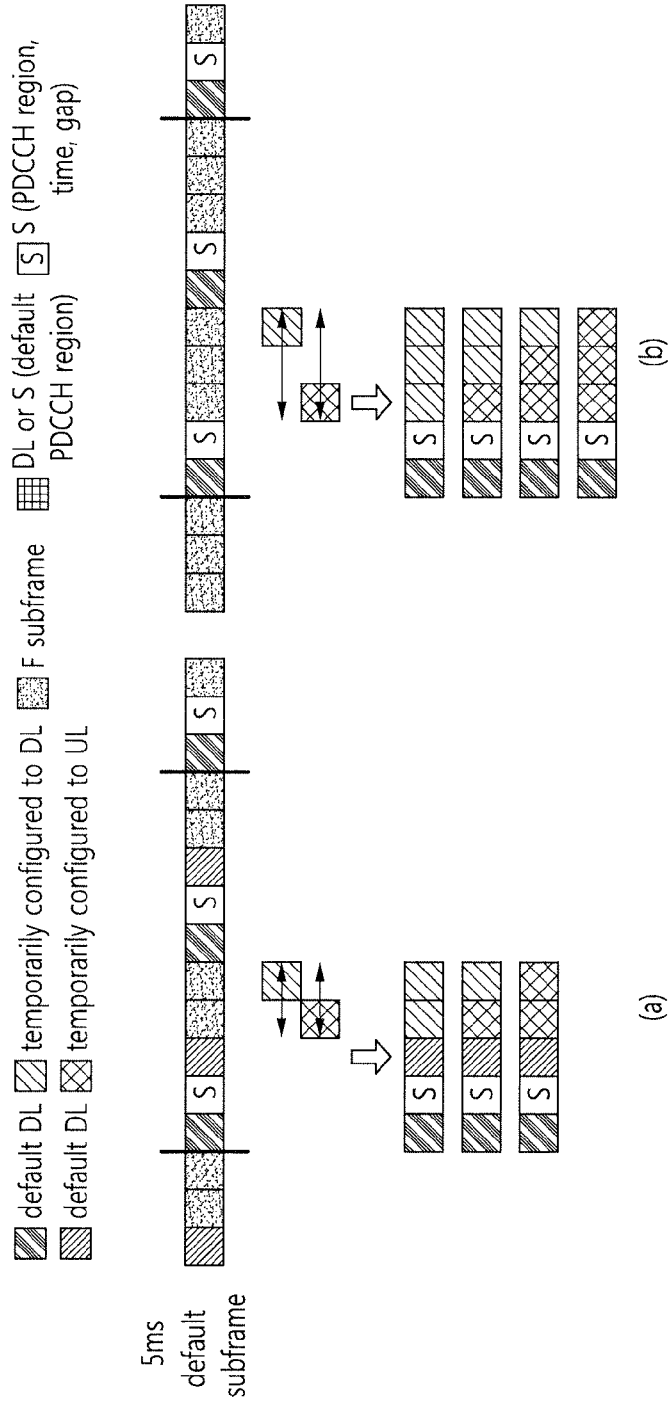
FIG. 17, including views (a) and (b), and FIG. 18, including views (a) and (b), show examples of configuring F subframes by selecting from a DL subframe, an S subframe, and a UL subframe when default subframes are set to a 5 ms period, and FIG. 19, including views (a) and (b), and FIG. 20, including views (a) and (b), show the same example when the default subframes are set to a 10 ms period.
Figure 18:
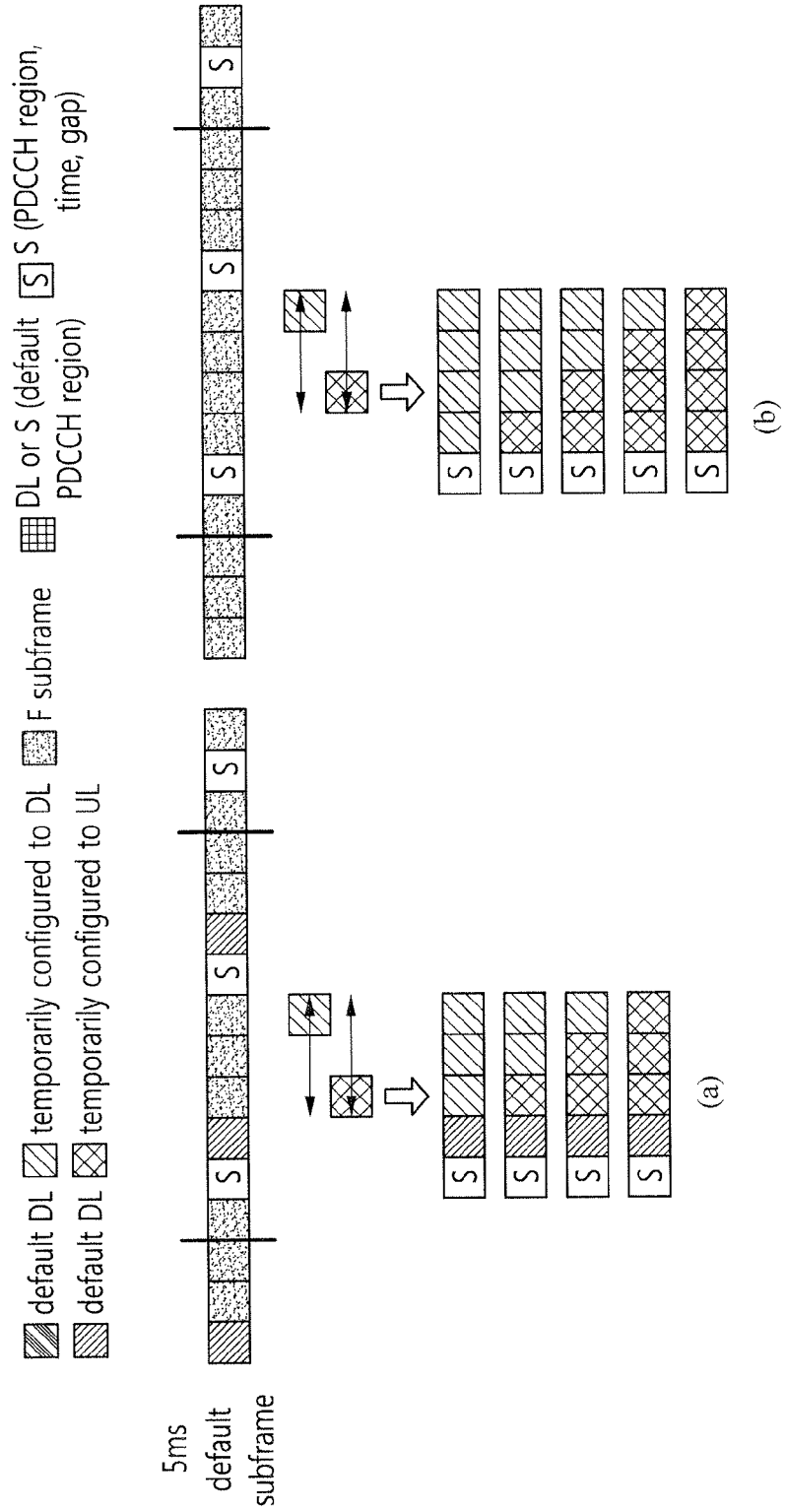
Figure 19:
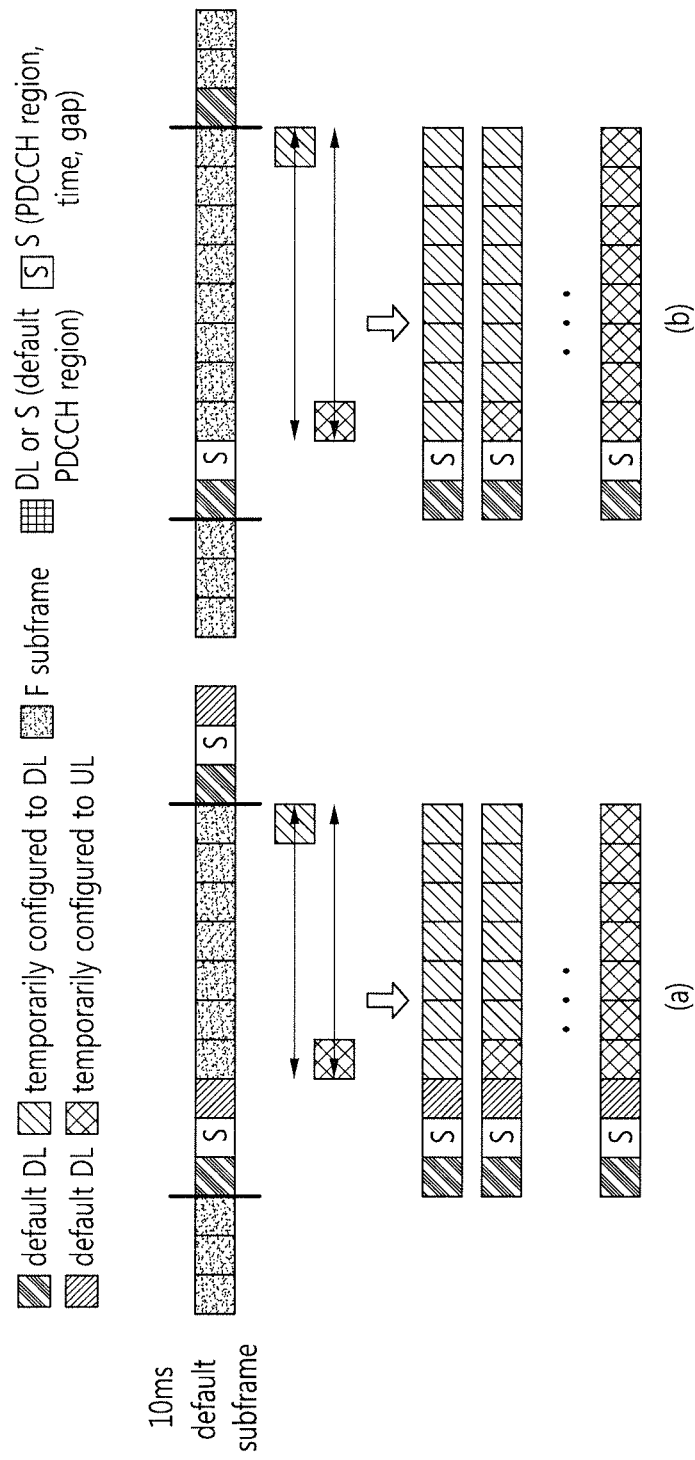
Figure 20:
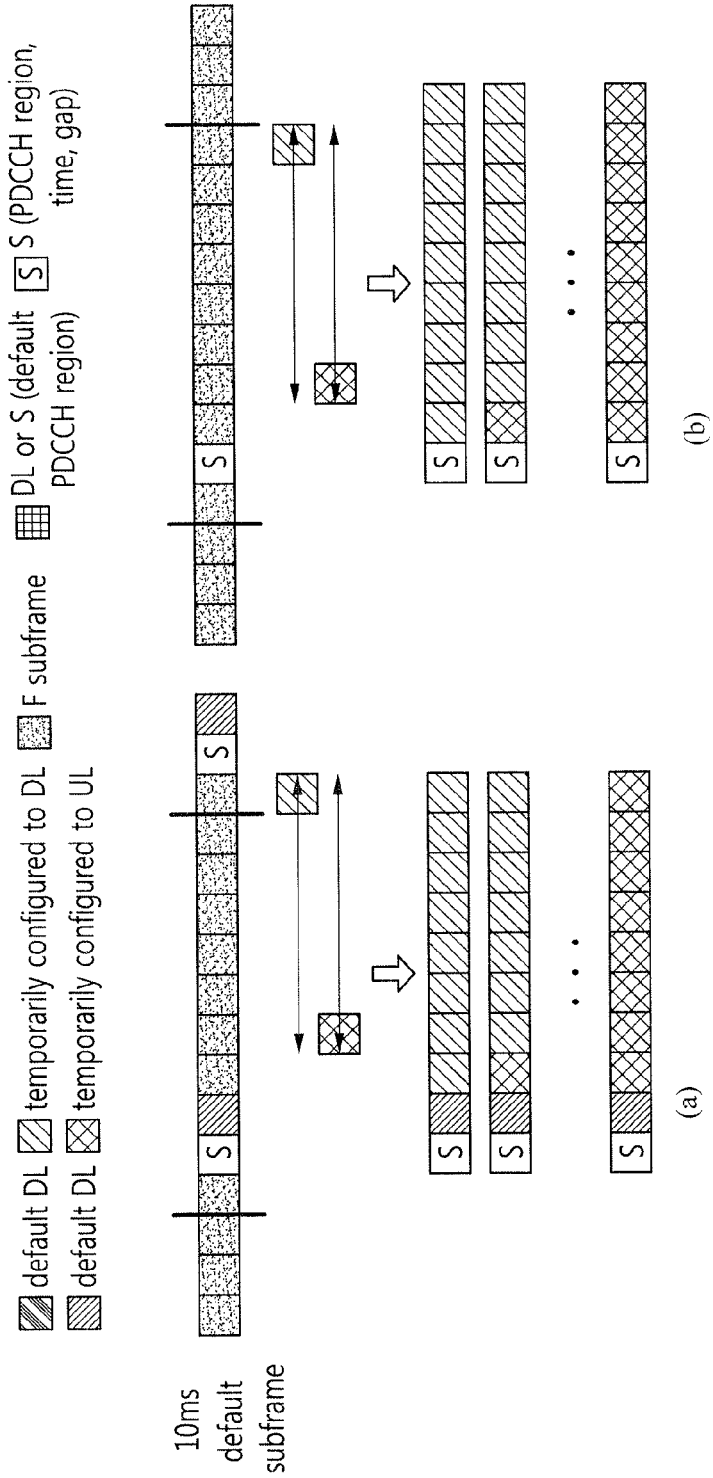

FIG. 17, including views (a) and (b), and FIG. 18, including views (a) and (b), show examples of configuring F subframes by selecting from a DL subframe, an S subframe, and a UL subframe when default subframes are set to a 5 ms period, and FIG. 19, including views (a) and (b), and FIG. 20, including views (a) and (b), show the same example when the default subframes are set to a 10 ms period.

Referring to FIG. 17 to FIG. 20, an F subframe configured to an S subframe has a fixed location.

In FIG. 17 and FIG. 19(a), it is configured in the order of a default DL subframe, an S subframe, and a default UL subframe. In FIG. 17 and FIG. 19(b), it is configured in the order of a default DL subframe and an S subframe in the absence of a default UL subframe. In this case, a function of a default UL subframe can be performed in a resource region after a time gap in an S subframe. For example, a UE can perform uplink control information (UCI) transmission, RACH preamble transmission, SRS transmission, etc. For this, the S subframe may be configured only with a time gap and a UpPTS region used for UL transmission in the absence of a DwPTS region used for DL transmission.

In FIG. 18 and FIG. 20(a), it is configured in the order of an S subframe and a default UL subframe in the absence of a default DL subframe. In this case, a function of a default DL subframe can be performed in a resource region before a time gap in an S subframe. For example, a BS can transmit PCFICH, PDCCH, PHICH, CSI RS, etc.

In FIG. 18 and FIG. 20(b), only a fixed S subframe is configured in the absence of a default subframe. In this case, a function of a default DL subframe can be performed in a resource region before a time gap in an S subframe, and a function of a default UL subframe can be performed in a resource region after a time gap.

FIG. 17 and FIG. 18 can be applied according to the following methods.

A BS can transmit a UL-DL configuration to a UE. For example, it can be reported that a TDD frame is configured to the UL-DL configuration 0 of Table 1 by using an SIB 1. In this case, the UE can recognize subframes configured to a DL subframe and an S subframe as a default DL subframe and a default S subframe in the UL-DL configuration 0. Then, since locations of subframes in which a synchronous signal, a PBCH, etc., are transmitted are fixed, backward compatibility can be maintained.

Thereafter, the BS can perform a configuration to switch some or all of UL subframes adjacent to the default DL subframe to DL subframes. In this case, it can be pre-agreed that a UL subframe used by switching to a DL subframe is gradually used starting from a UL subframe adjacent to the default DL subframe.

TABLE 3

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 mS | D | S | U | U | U | D | S | U | U | U |
| 1 | 5 mS | D | S | U | U | D | D | S | U | U | D |
| 2 | 5 mS | D | S | U | D | D | D | S | U | D | D |
| 3 | 10 mS | D | S | U | U | U | D | D | D | D | D |
| 4 | 10 mS | D | S | U | U | D | D | D | D | D | D |
| 5 | 10 mS | D | S | U | D | D | D | D | D | D | D |
| 6 | 5 mS | D | S | U | U | U | D | S | U | U | D |

For example, in Table 3 above, if the UL-DL configuration 0 is used, it is assumed that subframes 2, 3, and 4 are UL subframes that can be borrowed for use as DL subframes. In this case, the subframe 4, the subframe 3, and the subframe 2, in that order, can be borrowed for use as DL subframes by the BS.

According to this method, if the UE recognizes that the subframe 3 is borrowed for use as a DL subframe, it can be pre-known that the subframe 4 is apparently used as a DL subframe. Therefore, the UE can know that the subframe 4 is an effective DL subframe capable of performing DL measurement.

In addition, according to this method, since it is always configured in the order of the UL subframe and the DL subframe, an additional time gap is not required in addition to the S subframe.

Alternatively, in the UL-DL configurations of Table 3 above, the BS may restrict a UL subframe to be borrowed for use as a DL subframe only to a UL subframe immediately before a default DL subframe.

In the aforementioned method, according to a configuration, if subframes (e.g., a DL subframe, an S subframe, and a DL subframe) before or after an S subframe have the same transmission direction and the UE can know this, the S subframe can be borrowed for use as a DL subframe or a UL subframe without having to include a time gap.

Hereinafter, a signaling timing such as a grant transmission timing between a BS and a UE, a HARQ process timing, etc., will be described in a case where a default subframe and F subframes are configured in a frame according to the aforementioned methods.

In a PHICH response for a PUSCH, PUSCH transmission using a UL grant, UL ACK/NACK transmission for PUSCH reception, a delivery delay, processing delay time, or the like exists between a downlink and an uplink. Therefore, a minimum response delay time considering such a delay time is required. The minimum response delay time is hereinafter called $k_{min}$. That is, the minimum response delay time $k_{min}$ is required between coupled DL reception and UL transmission.

As such, when a control channel and a data channel which are associated with each other are transmitted in different subframes, a corresponding control signal may be transmitted in a default UL subframe or a default DL subframe. For example, a time relation for guaranteeing $k_{min}$ can be set to transmit ACK for a PDSCH with respect to the default UL subframe, and a time relation for guaranteeing $k_{min}$ can be set to transmit a PHICH and a UL grant with respect to the default DL subframe.

A P subframe for an initial access and a default subframe additionally configured may be present in a distinctive manner. In this case, it may be necessary to operate only with a P subframe before a default subframe is configured. Therefore, for the control channel and the data channel which are associated with each other and are used in an initial access, a time relation is set by using only a P subframe in case of the control channel. In case of the data channel, a time relay can be set to use a P subframe or data can be transmitted in a pre-agreed or determined default subframe after the control channel is received.

In case of a UL grant, a subframe associated with a DL subframe for receiving the UL grant must be a UL subframe due to a timing difference. Therefore, it is not desired to transmit the UL grant unconditionally in the F subframe simply because the F subframe is configured to a DL subframe, and it is desired to transmit the UL grant only when the subframe associated with the F subframe is a UL subframe.

A UE can operate as follows when a subframe located later by $k_{min}$ is a default subframe after PDSCH reception.

1. The default DL subframe is borrowed for use in a UL transmission direction.

2. A DL transmission direction is maintained in the default DL subframe, and ACK/NACK is transmitted in a next default UL subframe closest in distance thereto.

PDSCH transmission for a DL grant can be processed in the same DL subframe. Therefore, the DL grant can be transmitted in a default DL subframe in which a PDSCH scheduled by the DL grant is transmitted, or can be transmitted in an F subframe in which a PDSCH scheduled by the DL grant is transmitted.

Alternatively, in order to decrease an unnecessary blind decoding attempt in the F subframe, a DL grant for a PDSCH transmitted using the F subframe can be pre-agreed to be transmitted only in the default DL subframe. That is, cross subframe scheduling in which the DL grant and the PDSCH are crossed can be used in different subframes.

In addition, regarding an HARQ process, in case of the default subframe, a synchronous HARQ process autonomous retransmission based on PHICH transmission may be allowed. In the F subframe, it may operate as an asynchronous HARQ process without the PHICH transmission, or even if it operates as the synchronous HARQ process, autonomous retransmission may not be allowed. In this case, retransmission can be performed only by the UL grant.

When UL ACK/NACK is transmitted in a UL subframe, the UE determines a payload of ACK/NACK according to a transmission mode and a sum of the maximum number of DL subframes associated (i.e., scheduled) with an F subframe and the number of default DL subframes.

In this case, if a PDSCH is scheduled or a PDCCH requesting an ACK/NACK response is scheduled only in the default DL subframe, the ACK/NACK payload can be determined according to the number of corresponding default DL subframes and the transmission mode. A PUCCH resource and format by which ACK/NACK is transmitted may vary depending on a size of the ACK/NACK payload. In addition, the PUCCH resource and format by which ACK/NACK is transmitted may vary in a case where a PDSCH is scheduled only in a default DL subframe or a PDCCH requesting an ACK/NACK response is scheduled and otherwise cases.

For example, when one default DL subframe is associated with an F subframe and a PDSCH is scheduled only in the default DL subframe and a PDCCH requesting an ACK/NACK response is scheduled, ACK/NACK can be transmitted by using a dynamic PUCCH format 1a/1b corresponding to a first CCE in which a PDCCH for scheduling a PDSCH or a PDCCH for requesting an ACK/NACK response. Otherwise, a PUCCH format 3 allocated explicitly can be used in transmission.

The aforementioned methods can also be applied to a carrier aggregation system which aggregates multiple carriers. For example, the methods can be applied to an operation in a primary cell in which a UE performs an initial access or re-access process with respect to a BS. That is, a default subframe configuration and control signal transmission method can be applied to a primary component carrier (PCC) of the primary cell, and an F subframe configuration and data transmission method can be applied to a secondary component carrier (SCC).

In addition, in a case where a PDCCH and a PDSCH are transmitted in different carriers or a PUSCH scheduled by the PDCCH is transmitted in another carrier other than a carrier in a carrier linked by default, a method of transmitting a UL grant, a PHICH, a PUCCH, etc., in the PCC can use a default frame configuration and control signal transmission method.

In case of non-cross carrier scheduling, PUCCH transmission of the PCC can use the default subframe configuration and control signal transmission method, and transmission of the UL grant and the PHICH in each carrier can use the default subframe configuration and control signal transmission method for each carrier.

Figure 21:
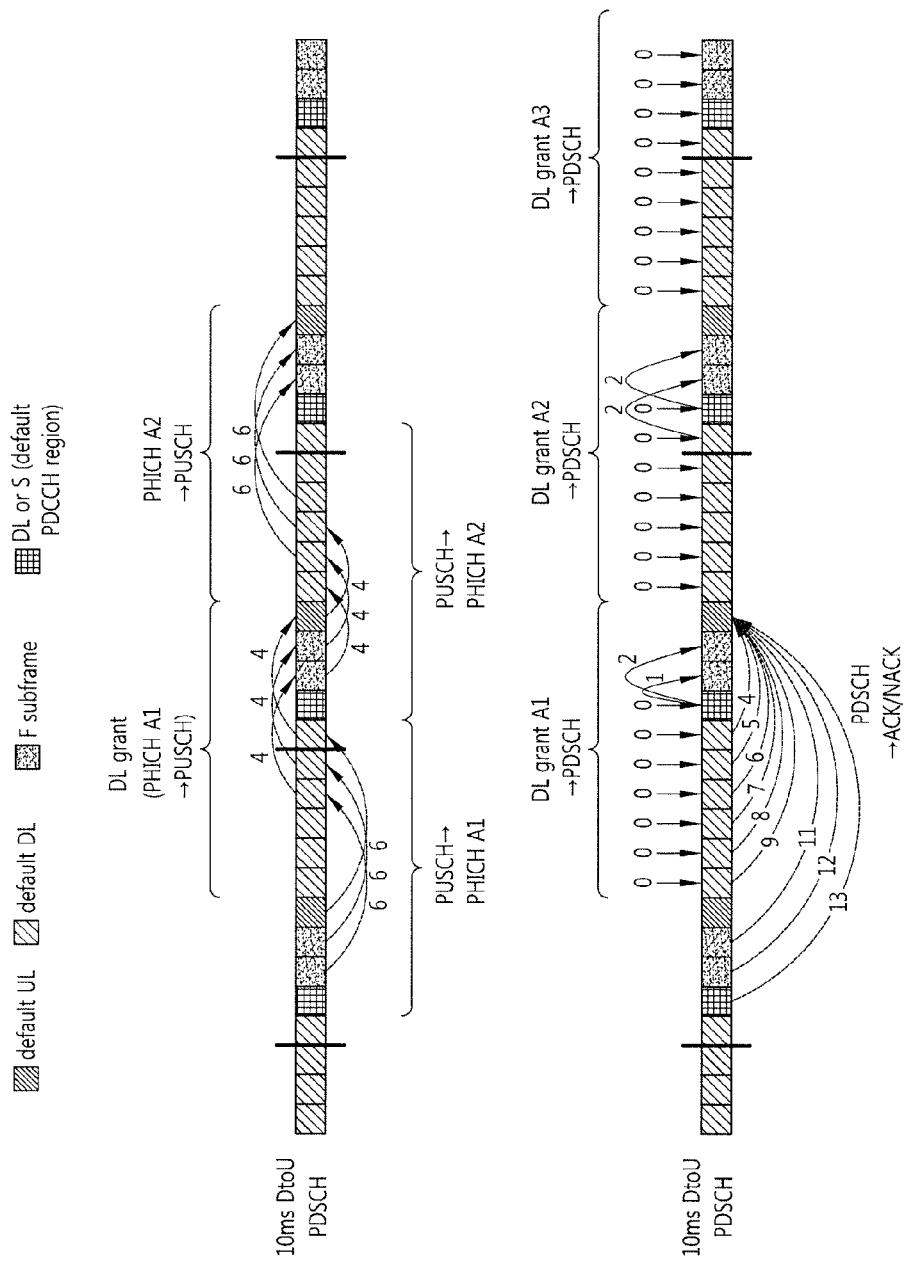
FIG. 21 shows an example of a signaling timing between a base station (BS) and a UE when a default subframe is configured with a 10 ms period.
Figure 22:
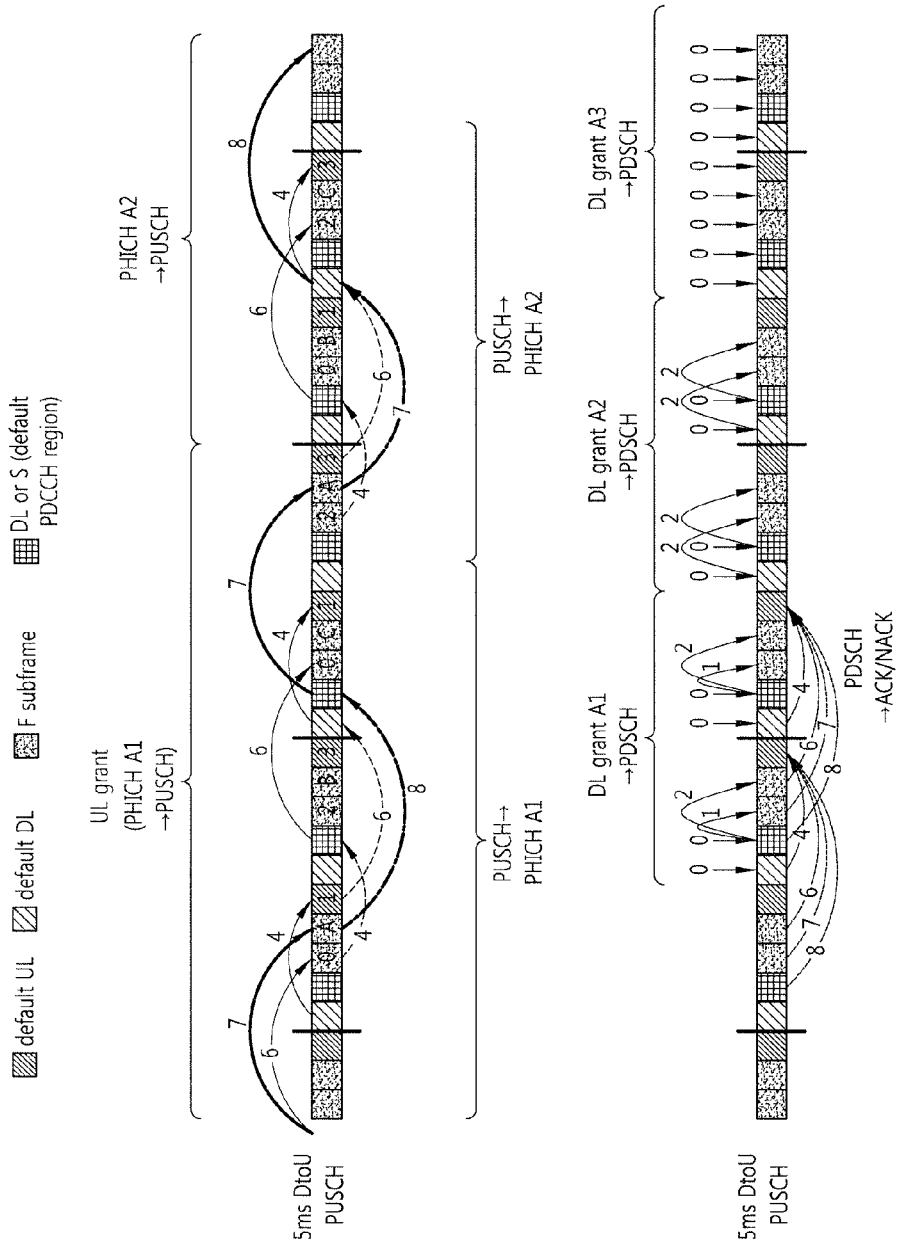
FIG. 22 shows an example of a signaling timing between a BS and a UE when a default subframe is configured with a 5 ms period.

FIG. 21 shows an example of a signaling timing between a BS and a UE when a default subframe is configured with a 10 ms period. FIG. 22 shows an example of a signaling timing between a BS and a UE when a default subframe is configured with a 5 ms period.

Referring to FIG. 21 and FIG. 22, a UL grant is transmitted only in a default DL subframe. If there is a subframe in which a default PDCCH is guaranteed, the subframe can also be included.

If a default UL subframe or an F subframe in which a PUSCH is transmitted is a subframe n, a subframe in which a UL grant for scheduling the PUSCH is transmitted is a default DL subframe located earlier by at least $k_{min}$. That is, the default DL subframe in which the UL grant is transmitted is located before a subframe n-4.

The PHICH is transmitted only in the default subframe.

A timing at which the PHICH is transmitted can be: 1) transmitted in a subframe separated by a minimum time interval satisfying $k_{min}$ in a subframe in which the UE transmits the PUSCH, or can be: 2) adjusted to a fastest retransmission UL grant timing with respect to the same HARQ process.

The HARQ process can satisfy the following timing.

Referring to FIG. 21, the number of subframes required when an HARQ process period returns can be commonly set to 10 in the same HARQ process. In addition, autonomous retransmission can be performed in a default UL subframe. In a situation where autonomous retransmission is allowed, if an F subframe is used as a DL subframe, a BS can stop retransmission by transmitting ACK through a PHICH.

Alternatively, if the F subframe is configured to a UL subframe since an error occurs in a process of configuring to the DL subframe, it may act as an interference to an adjacent DL subframe. Therefore, in the F subframe, autonomous retransmission can be prohibited, and UL transmission can be performed only through a UL grant.

An asynchronous HARQ process is applicable for a unity of an operation in a default UL subframe, and is preferably applied for effective UL utilization also in an F subframe.

A default UL subframe can operate with a synchronous HARQ, and an F subframe can operate with an asynchronous HARQ.

A DL grant for scheduling a PDSCH can be transmitted only in a default DL subframe. In addition, if there is a subframe in which a default PDCCH is guaranteed, a DL grant for scheduling a PDSCH can be transmitted also in the subframe. In this case, a subframe for transmitting the DL grant can be determined by preferentially considering: 1) transmission in a default DL subframe which is closest in distance to a subframe to be scheduled or 2) uniform distribution in a DL subframe in a frame.

In another method, the DL grant is not limited to: 3) being transmitted only in the default DL subframe, and thus can be transmitted in a PDCCH of a subframe in which a PDSCH is transmitted. In this case, if it is pre-known that the subframe will be used as a UL subframe, blind decoding of the PDCCH is not attempted in the subframe.

ACK/NACK can be processed only in the default UL subframe. In this case, a minimum distance satisfying $k_{min}$ is taken into consideration. ACK/NACK transmission using the F subframe is not desired.

Referring to FIG. 22, the number of subframes required when an HARQ period returns cannot be commonly set to 10 in a synchronous HARQ process. Therefore, the HARQ period can be set differently. For example, with respect to subframes #2, 4, 7, and 9 (i.e., subframes of which HARQ process numbers indicated in the subframes are 0, 1, 2, and 3), the HARQ period is set to 10 subframes. On the other hand, with respect to subframe #3 and 8 (i.e., subframes of which HARQ process numbers indicated in the subframes are A, B, and C), the HARQ period is set to 15 subframes. In this case, the number of HARQ processes that can be simultaneously performed is 7. Although each HARQ period can be set to the same period (i.e., 15 subframes), it leads to an increase in the HARQ period and an increase in the number of processes.

Figure 23:
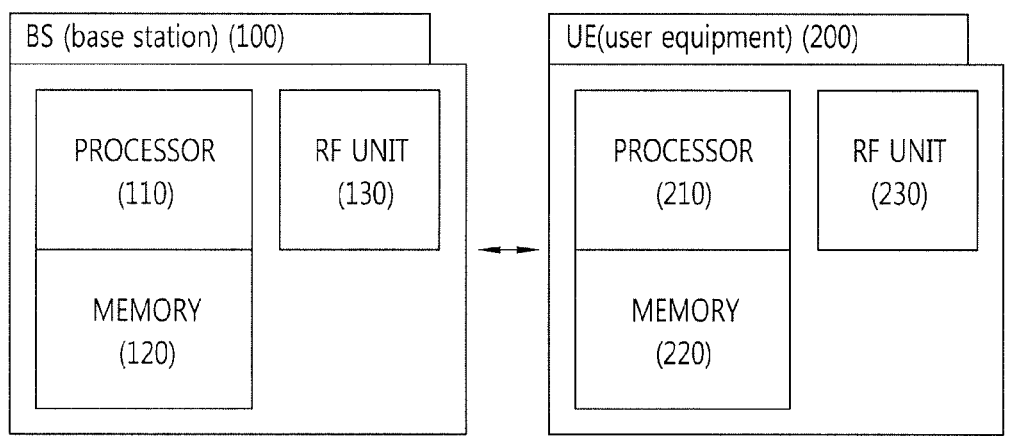
FIG. 23 is a block diagram showing a wireless device according to an embodiment of the present invention.

FIG. 23 is a block diagram showing a wireless device according to an embodiment of the present invention.

A BS 100 includes a processor 110, a memory 120, and a radio frequency (RF) unit 130. The processor 110 implements the proposed functions, procedures, and/or methods. For example, the processor 110 transmits frame configuration information. The frame configuration information is information which configures each of subframes in a frame to any one of a default subframe and a flexible subframe. In addition, the processor 110 transmits scheduling information for scheduling the configured flexible subframe, and transmits and receives a signal based on the scheduling information in the configured flexible subframe. As described above, the default subframe is a subframe of which a transmission direction is fixed, and the flexible subframe which can be used as a UL subframe, a DL subframe, or an S subframe according to the scheduling information. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives frame configuration information to recognize which subframe is used between a default subframe and a flexible subframe among respective subframes in a frame. In addition, the processor 210 receives scheduling information for scheduling the configured flexible subframe, and transmits and receives a signal based on the scheduling information in the configured flexible subframe. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for configuring subframes in a wireless communication system, the method performed by a user equipment (UE) and comprising:
   receiving an uplink-downlink configuration from a base station,
   wherein the uplink-downlink configuration indicates each of a plurality of subframes in a frame to any one of a downlink subframe, a special subframe and an uplink subframe, and
   wherein the special subframe includes a downlink pilot time slot (DwPTS), a guard period (GP) and an uplink pilot time slot (UpPTS);
   receiving frame configuration information from the base station;
   configuring each of the plurality of subframes in the frame to any one of a downlink subframe, a special subframe and an uplink subframe based on the uplink-downlink configuration and the frame configuration information; and
   communicating with the base station using the configured subframes,
   wherein a subframe indicated as a downlink subframe or a special subframe by the uplink-downlink configuration cannot be indicated as an uplink subframe by the frame configuration information, and
   wherein a subframe indicated as an uplink subframe by the uplink-downlink configuration can be indicated as a downlink subframe by the frame configuration information.

2. The method of claim 1, wherein the uplink-downlink configuration is received through a radio resource control (RRC) message.

3. The method of claim 1, wherein the uplink-downlink configuration indicates any one of uplink-downlink configurations included in the below table:

| Uplink-downlink configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

4. The method of claim 1, wherein the frame configuration information is received in a first subframe of the frame.

5. The method of claim 1, wherein if the frame consists of 10 subframes and is indexed from 0 to 9 in sequence, subframes configured to a downlink subframe in the frame comprise a subframe #0 and a subframe #5.

6. The method of claim 5, wherein if the frame consists of 10 subframes and is indexed from 0 to 9 in sequence, subframes configured to a special subframe in the frame comprise a subframe #1.

7. A user equipment (UE) comprising:
   a radio frequency (RF) unit configured to transmit and receive a radio signal; and
   a processor operably coupled with the RF unit,
   wherein the processor is configured to:
      control the RF unit to receive an uplink-downlink configuration from a base station,
      wherein the uplink-downlink configuration indicates each of a plurality of subframes in a frame to any one of a downlink subframe, a special subframe and an uplink subframe, and
      wherein the special subframe includes a downlink pilot time slot (DwPTS), a guard period (GP) and an uplink pilot time slot (UpPTS),
      control the RF unit to receive frame configuration information from the base station,
      configure each of the plurality of subframes in the frame to any one of a downlink subframe, a special subframe and an uplink subframe based on the uplink-downlink configuration and the frame configuration information, and
      control the RF unit to communicate with the base station using the configured subframes,
   wherein a subframe indicated as a downlink subframe or a special subframe by the uplink-downlink configuration cannot be indicated as an uplink subframe by the frame configuration information, and
   wherein a subframe indicated as an uplink subframe by the uplink-downlink configuration can be indicated as a downlink subframe by the frame configuration information.

8. The UE of claim 7, wherein the uplink-downlink configuration is received through a radio resource control (RRC) message.

9. The UE of claim 7, wherein the uplink-downlink configuration indicates any one of uplink-downlink configurations included in the below table:

| Uplink-downlink configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

10. The UE of claim 7, wherein the frame configuration information is received in a first subframe of the frame.

11. The UE of claim 7, wherein if the frame consists of 10 subframes and is indexed from 0 to 9 in sequence, subframes configured to a downlink subframe in the frame comprise a subframe #0 and a subframe #5.

12. The UE of claim 7, wherein if the frame consists of 10 subframes and is indexed from 0 to 9 in sequence, subframes configured to a special subframe in the frame comprise a subframe #1.

* * * * *